US010365853B2

(12) United States Patent
Iwata

(10) Patent No.: US 10,365,853 B2
(45) Date of Patent: Jul. 30, 2019

(54) DATA STORAGE APPARATUS, RECORDING MEDIUM AND METHOD FOR SELECTIVELY DUPLICATING DATA BLOCKS TO ANOTHER MEDIUM BASED ON DATA BLOCK SIZE AND DIMENSION INFORMATION OR AN AXIS OF OBTAINING DATA

(71) Applicant: FUJITSU LIMITED, Kawasaki-shi, Kanagawa (JP)

(72) Inventor: Satoshi Iwata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/435,376

(22) Filed: Feb. 17, 2017

(65) Prior Publication Data
US 2017/0255391 A1 Sep. 7, 2017

(30) Foreign Application Priority Data

Mar. 1, 2016 (JP) .................. 2016-038803

(51) Int. Cl.
*G06F 3/06* (2006.01)
(52) U.S. Cl.
CPC ............ *G06F 3/065* (2013.01); *G06F 3/0611* (2013.01); *G06F 3/0685* (2013.01)
(58) Field of Classification Search
CPC ....... G06F 3/065; G06F 3/0611; G06F 3/0685
See application file for complete search history.

(56) References Cited

U.S. PATENT DOCUMENTS 4,937,572 A * 6/1990 Yamada ................. G01C 21/32
340/990
6,173,362 B1 1/2001 Yoda
(Continued)

FOREIGN PATENT DOCUMENTS

JP 60-49431 3/1985
JP 10-187505 7/1998
(Continued)

OTHER PUBLICATIONS

Grawinkel et al., "Analysis of the ECMWF Storage Landscape", USENIX The Advance Computing Systems Association, In Proceedings of the 13th USENIX Conference on File and Storage Technologies (Feb. 16-19, 2015) (14 pages).
(Continued)

*Primary Examiner* — Glenn Gossage
(74) *Attorney, Agent, or Firm* — Fujitsu Patent Center

(57) ABSTRACT

A processor controls a second storage device including a plurality of media that store data stored in a first storage device. The processor calculates a ratio of the size of each of a plurality of data blocks, which are classified according to a plurality of pieces of dimension information in data stored in two or more of the plurality of media, to the amount of data stored in the two or more of the plurality of media. The processor determines, based on a calculated ratio, whether a data block is to be duplicated, generates a duplicate of the data block determined to be duplicated, and stores the generated duplicate of the data block into another medium of the plurality of media, except for the two or more media. This can reduce the number of times of changing a medium, and suppress a lowering in the capacity efficiency. Dimension information may be an axis of obtaining data. In additionally disclosed embodiments, data may be arranged based on data blocks originally generated for reliability and considering the axis of obtaining data, and data at an end (Continued)

portion of a medium may be redundantly stored in the front or top portion of a subsequent medium.

12 Claims, 30 Drawing Sheets

(56) References Cited

U.S. PATENT DOCUMENTS

| | | | |
|---|---|---|---|
| 2002/0036856 A1* | 3/2002 | Korst | H04N 21/2326 360/55 |
| 2004/0010613 A1* | 1/2004 | Apostolopoulos | H04L 29/06027 709/231 |
| 2013/0246580 A1* | 9/2013 | Ozawa | H04L 67/1097 709/219 |

FOREIGN PATENT DOCUMENTS

| | | |
|---|---|---|
| JP | 2004-334969 | 11/2004 |
| JP | 2005-322099 | 11/2005 |

OTHER PUBLICATIONS

Gharaibeh et al., "DedupT: Deduplication for Tape Systems", In Proceedings of the 30th IEEE International Conference on Massive Storage Systems and Technology 2014 (11 pages).

* cited by examiner

FIG. 23

| TYPE | RATE |
|------|------|
| A | 0.9% |
| B | 1.0% |
| C | 2.0% |
| D | 2.8% |
| E | 14.1% |
| F | 25.6% |
| OTHERS | 53.6% |

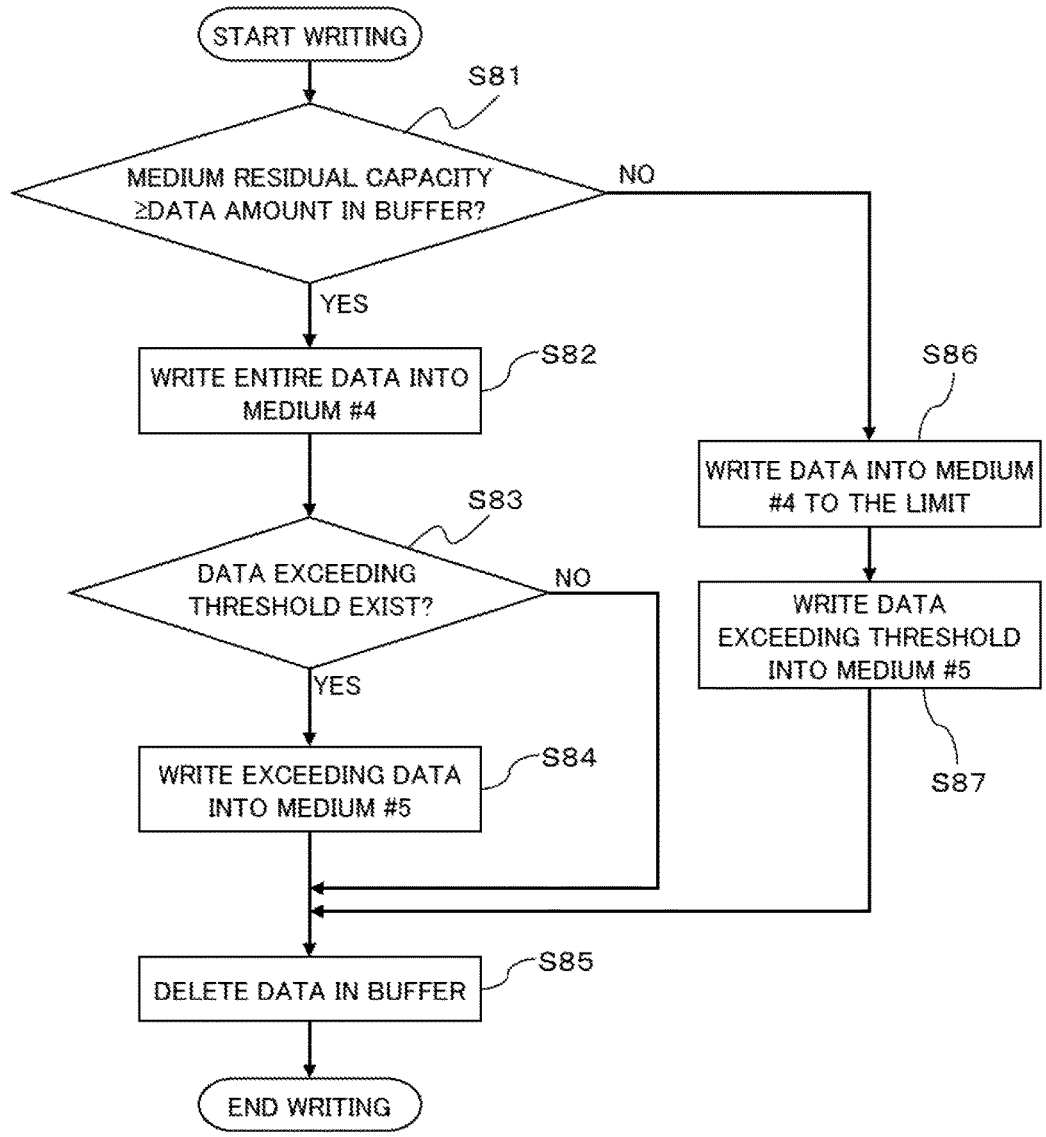

DATA STORAGE APPARATUS, RECORDING MEDIUM AND METHOD FOR SELECTIVELY DUPLICATING DATA BLOCKS TO ANOTHER MEDIUM BASED ON DATA BLOCK SIZE AND DIMENSION INFORMATION OR AN AXIS OF OBTAINING DATA

CROSS-REFERENCE TO RELATED APPLICATION

This application is based upon and claims the benefit of priority of the prior Japanese Application No. 2016-38803 filed on Mar. 1, 2016 in Japan, the entire contents of which are hereby incorporated by reference.

FIELD

The embodiments discussed herein are related to a data storage apparatus, a non-transitory computer-readable recording medium having stored therein a data storage apparatus control program, and a method for controlling a data storage device.

BACKGROUND

In past several years, increasing data amount has accompanied a problem of increasing costs for storage. Considering the above, a concept of cold storage has been attractive to reduce the costs. Cold storage is an inexpensive storage device at the sacrifice of its performance and is exemplified by a tape storage device and an optical disk storage device, which each can be regarded as a library unit.

Such cold storage is used in conjunction with hot storage in a storage system. Hot storage is high in both performance and price and is exemplified by a Solid State Drive (SSD) and a Hard Disk Drive (HDD). In such a storage system, data less frequently accessed as time passes is migrated from the hot storage to the cold storage.

An SSD and a HDD each have a configuration that a medium that stores data is integrated with the drive that makes writing and reading accesses to the medium. This configuration makes it possible to start, immediately upon receipt of a request to read and write data from and into the medium, data writing into and data reading from the medium.

In contrast to the above, when writing and reading data into and from a medium, tape storage and optical disk storage insert a medium to be accessed into a drive. For example, tape storage uses a magnetic tape as a medium and optical disk uses an optical disk as a medium.

This means that tape storage and optical disk storage each include a medium and a drive which are isolated from each other and the cost of such type of storage can be reduced by reducing the number of drives. In such tape storage and optical disk storage, media are stored in the shelf of the storage casing and a few drives are also placed in the shelf. When the storage is making an access to a medium, a magazine carrier (robot) brings the medium to be accessed to the drive. It takes a time in units of minutes to change a medium to be inserted into drive, depending on the scale of the storage system, of course.

Accordingly, cold storage such as tape storage and optical disk storage preferably stores a series of data successively accessed in the same medium where possible, so that the time taken to access the data in the medium is minimized.

When each half of a series of data that takes two minutes to be read is dividedly stored in one of medium #0 and the medium #1, it takes the following time to read the entire series of data from the media #0 and #1. Assuming that it takes two minutes to change a medium placed in a drive, it takes two minutes to insert the medium #0 into the drive; one minute to read data from medium #0; two minutes to insert the medium #1 into the drive; and one minute to read data from medium #1. Consequently, it takes six minutes in total to obtain the series of data. In contrast, in cases where the same amount of data is stored in a single medium #2, the time taken to obtain the series of data is reduced to four minutes including two minutes to insert the medium #2 into the drive and two minutes to read data from the medium #2.

[Patent Literature 1] Japanese Laid-open Patent Publication No. 2004-334969

[Patent Literature 2] Japanese Laid-open Patent Publication No. 2005-322099

[Patent Literature 3] Japanese Laid-open Patent Publication No. SHO 60-49431

[Patent Literature 4] Japanese Laid-open Patent Publication No. HEI 10-187505

NON-PATENT LITERATURE

[Non-Patent Literature 1] Grawinkel et al., Analysis of the ECMWF Storage Landscape, In Proc. of the 13th USENIX Conference on File and Storage Technologies, 2015

[Non-Patent Literature 2] Gharaibeh et al., DedupT: Deduplication for Tape Systems, In Proc. of the 30th IEEE International Conference on Massive Storage Systems and Technology, 2014

In such cold storage, in order to reduce the time taken to access a medium, it is an important issue to reduce the number of times of changing a medium, reducing the capacity efficiency (see Non-Patent Literature 1). A method has been proposed which, in a system that eliminates data redundancy, reduces the number of times of changing media when data is to be obtained (see Non-Patent Literature 2). However, the proposed method is uniquely applied to avoiding elimination of data redundancy and therefore is incompatible with the data using manner of the embodiment detailed herein.

SUMMARY

According to an aspect of the embodiments, a data storage apparatus includes: a plurality of media that store data stored in a first storage device; a memory; and a processor coupled to the memory. The processor is configured to: calculate a ratio of each of a plurality of data blocks, which are classified according to a plurality of pieces of dimension information in the data stored in two or more of the plurality of media, to the data; determine, based on the calculated ratio, whether the data block is to be duplicated; and generate a duplicate of a data block determined to be duplicated and store the generated duplicate into another medium of the plurality of media except for the two or more media.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 23 is a table denoting a rate of each type of sample data of a certain axis of obtaining data;

FIG. 30 is a flow diagram denoting a succession of procedural steps performed by a data storage device control program of the third embodiment.

DESCRIPTION OF THE PREFERRED EMBODIMENTS

Hereinafter, a data storage device (data storage apparatus), a non-transitory computer-readable recording medium having stored therein a data storage device control program, and a method for controlling a data storage device according to the embodiments will now be detailed with reference to accompanying drawings. The following embodiments are exemplary and there is no intention to exclude various modifications and applications of techniques not mentioned in the following embodiments. In other words, various changes and modifications can be suggested without departing from the spirit of the embodiments. The drawings do not illustrate therein all the functions and elements included in the embodiment and may include additional functions and elements to those illustrated in the accompanying drawings.

(1) Overview of Technique of the Present Invention

Hereinafter, description will now be made on the assumption that data being stored in hot storage (first storage device) such as a HDD or an SSD is migrated to and stored in cold storage (second storage device) such as tape storage or optical disk storage.

The data includes data A, B, C, . . . corresponding to first-dimension information (e.g., time) and data X, Y, Z, . . . corresponding to second-dimension information (e.g., position or log data). Data A and data B may be referred to as first class data A and second class data B of the first-dimension information. Likewise, data X and data Y may also be referred to as first class data X and second class data Y of the second-dimension information.

The dimension information focused (referred) when data (hereinafter called "stored data") stored in the hot storage or the cold storage is classified or obtained may be referred to as an axis of obtaining data. The axis of obtaining data focusing on the first-dimension information may be denoted by the axis AB of obtaining data; and the axis of obtaining data focusing on the second-dimension information may be denoted by the axis XY of obtaining data.

Figure 1:
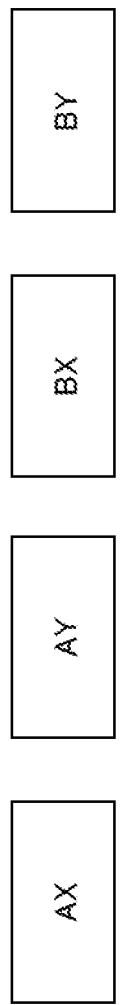
FIG. 1 is a diagram illustrating an example of classifying data blocks having two axes of obtaining data.

Here, description will be made on the assumption that data stored in the hot storage and the cold storage is classified into, as illustrated in FIG. 1, four patterns (four data blocks). FIG. 1 illustrates an example of classifying data blocks each having two axes AB and XY of obtaining data. In the example of FIG. 1, stored data is classified into a first data block AX, a second data block AY, a third data block BX, and a fourth data block BY.

The first data block AX is a data group classified into first class data A of the first-dimension information (e.g., time) and also classified into first class data X of the second-dimension data. The second data block AY is data group classified into first class data A of the first-dimension information and also classified into second class data Y of the second-dimension data (e.g., position or log data).

The third data block BX is a data group classified into second class data B of the first-dimension information and also classified into first class data X of the second-dimension data. The fourth data block BY is a data group classified into second class data B of the first-dimension information and also classified into second class data Y of the second-dimension data.

Arranging data blocks having a possibility of being simultaneously obtained in the same medium, focusing only on a single axis of obtaining data, would not be compatible with another axis of obtaining data.

Figure 2:
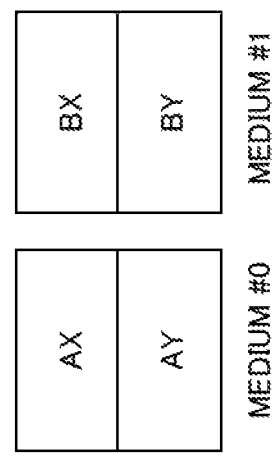
FIG. 2 is a diagram illustrating an example of arranging the data blocks of FIG. 1 preferable to an axis AB of obtaining data.

For example, data obtaining focusing on the axis AB of obtaining data arranges, as illustrated in FIG. 2, data blocks into the media #0 and #1. This makes it possible to obtain, when the data blocks AX and AY classified into the first class data A are to be obtained or when the data blocks BX and BY classified into the second class data B are to be obtained, desired data blocks without changing the medium. FIG. 2 is a diagram illustrating an example of appropriate arrangement of the data blocks of FIG. 1 along the axis AB of obtaining data. In the example of FIG. 2, the data blocks AX and AY are stored in the medium #0 and the data blocks BX and BY are stored in the medium #1.

In contrast to the above, in the event of data obtaining, focusing on the other axis XY of obtaining data, the arrangement of FIG. 2 needs a change from the medium #0 to the medium #1 as follows. In other words, obtaining the data blocks AX and BX classified into the first class data X or the data blocks AY and BY classified into the second class data Y needs access to the both media #0 and #1, and therefore a change of the medium occurs.

Figure 3:
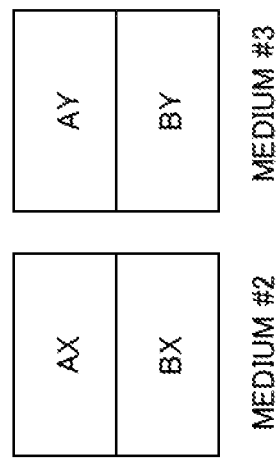
FIG. 3 is a diagram illustrating an example of arranging the data blocks of FIG. 1 preferable to an axis XY of obtaining data.

An appropriate data arrangement when giving preference to data obtaining focusing on the axis XY of obtaining data is one illustrated in FIG. 3. However, the arrangement of FIG. 3 needs a change of the medium when data is to be obtained, focusing on the axis AB of obtaining data, i.e., when data A is to be obtained or when data B is to be obtained. As described above, data obtaining does not always focus on a single axis of obtaining data. Therefore, a data arrangement is desired which allows data obtaining without changing the medium even if focusing on multiple axes of obtaining data.

FIG. 3 is an example of an appropriate arrangement of the data blocks of FIG. 1 along the axis XY of obtaining data. In the example of FIG. 3, the data blocks AX and BX are stored in the medium #2 and the data blocks AY and BY are stored in the medium #3.

Here, in obtaining data stored on a boundary of a medium or in the vicinity of the boundary, a change of a medium is sometimes needed despite obtaining a small amount of data.

Here, a consideration will now be given to a case where data, such as log data having the order of being stored the same as the order of obtaining data. Log data frequently values information (first-dimension information) related to time and an order, and is stored in the order of generation, aiming at retaining the information.

Figure 4:
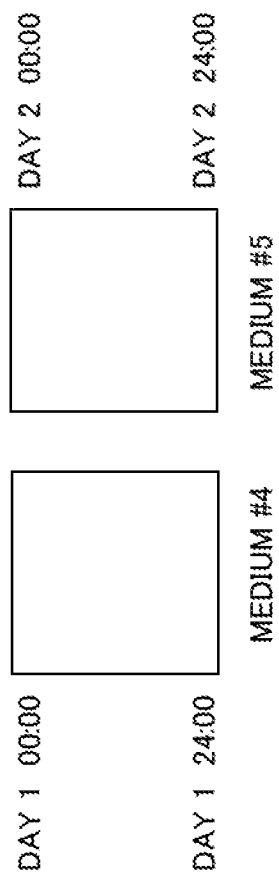
FIG. 4 is a diagram illustrating an example of arranging data when log data sequential along a time axis is to be stored into a medium in order of generation.

Namely, as illustrated in FIG. 4, log data from time 00:00 to time 24:00 of the first day is sequentially stored in the medium #4 and log data from time 00:00 to time 24:00 of the second day is sequentially stored in the medium #5. FIG. 4 illustrates an example of arranging data sequential along the time axis in the media #4 and #5 in the order of generation.

For example, data is to be obtained from a medium focusing on the vicinity of the time of occurrence of the failure or focusing on a predetermined range such as a day or a week to calculate statistical information from the log data. This means that time-series log data in the vicinity of the time of the occurrence of the failure or within a predetermined range is frequently extracted.

In the above method of obtaining data, a case where data of two-hour log is obtained from the data arrangement of FIG. 4. If the data to be obtained is log data of the time periods of: from the time 0:00 to the time 2:00 of the first day, from the time 12:00 to the time 14:00 of the first day, or from the time 19:00 to the time 21:00 of the second day, the object data can be obtained from a single medium without a change of the medium. In contrast, if the data to be obtained is two-hour log of the time period of from 23:00 of the first day to the 1:00 of the second day, i.e., over two consecutive days, the data to be obtained is stored in two media and a change of the media is needed.

(1-1) Overview of Arranging Data of the First Embodiment

The method of arranging data of the first embodiment (to be detailed below) does not adopt either one of the arrangements of FIGS. 2 and 3, but does adopt both the arrangements of FIGS. 2 and 3 by duplicating the stored data and storing the data in both arrangements. Under a state where the data is stored in the manner as described above, when the data is to be obtained (read), the method selects a medium from which the data to be selected in accordance with whether the data is to be obtained, focusing on the axis AB or the axis XY of obtaining data, in other words, in accordance with an axis of obtaining data being focused. For example, focusing on the axis AB of obtaining data, the media #0 and #1 of FIG. 2 are selected; and in data obtaining focusing on axis XY of obtaining data, the media #2 and #3 of FIG. 3 are selected.

However, simply storing the data in both arrangements means that the entire data is duplicated and the amount of data stored is twice the amount of data, which have a capacity efficiency of ½=50%.

Considering the above, the method of arranging data of the first embodiment focuses on a response time reducing rate (relative reducing time) and duplicates only the data being correlated with the response time reducing rate and having a smaller ratio to the entire data. This minimizes the reduction in capacity efficiency and also largely reduces the time for obtaining data.

Figure 5:
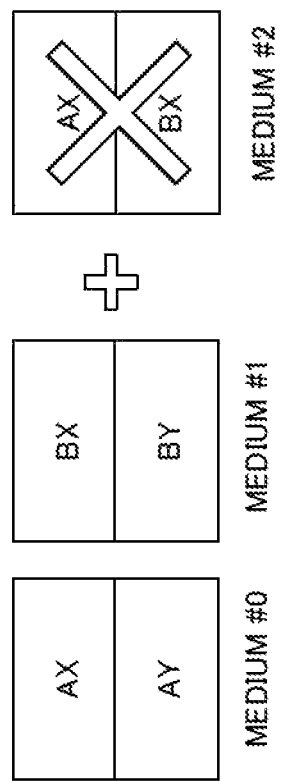
FIG. 5 is a diagram illustrating an overview of arranging data in which larger data blocks are not duplicated.

As illustrated in the example of FIG. 5, when the ratio of data X to the entire data is not small (50% in FIG. 5), the data blocks AX and BX classified into the first class data X are not duplicated. In contrast, as illustrated in FIG. 6, when the ratio of data X to the entire data is small (5% in FIG. 6), the data blocks AX and BX are duplicated and are stored in, for example, the media #2.

Figure 6:
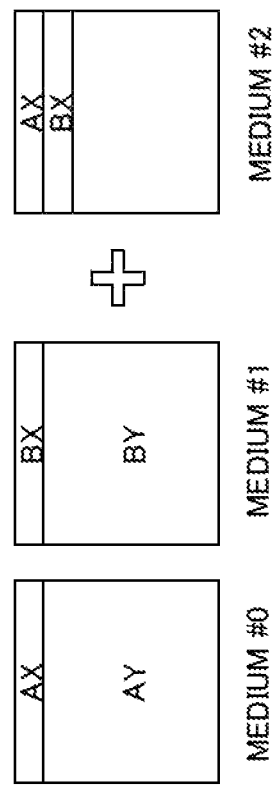
FIG. 6 is a diagram illustrating an overview of arranging and duplicating data in which smaller data blocks are selectively duplicated, according to a first embodiment.

In the respective examples of FIGS. 5 and 6, since the ratio of data Y to the entire data is not small (50% in FIG. 5, and 95% in FIG. 6), the data blocks AY and BY containing data Y are not duplicated. FIGS. 5 and 6 are diagrams explaining the overviews of data arrangement of the first embodiment. Specifically, FIG. 5 illustrates an example of the data arrangement when the data X occupies 50% of each of the medium #0 and #1 and FIG. 6 illustrates an example of the data arrangement when the data X occupies 5% of each of the medium #0 and #1.

As described above, the method of arranging data of the first embodiment achieves the well-balanced capacity efficiency and reduction in time taken to obtaining data by duplicating only a data block having a small ratio to the entire data, focusing on the response time reducing rate (relative reducing time). This means that it is possible to reduce the number of times of changing a medium, avoiding the lowering of the capacity efficiency, by appropriately arranging a duplicate of data. Consequently, a response time can be largely reduced and the time for obtaining data can also be reduced.

For example, description will now be made on the assumption that, as illustrated in FIG. 5, the data X being focused on occupies 50% of the respective media #0 and #1. Normally, it takes several hours to read (read out) the entire data stored in a single medium but the description here assumes that it takes 60 minutes to read the entire data. In addition, the description assumes that it takes two minutes to change a medium. Under this assumption, the time taken to read the entire data X (i.e., the data blocks AX and BX) from the data arrangement (i.e., the media #0 and #1) illustrated on the left side of FIG. 5 is calculated to be:

2 minutes to change the medium in the drive to the medium #0+30 minutes to read the data block AX from medium #0+2 minutes to change the medium in the drive to the medium #1+30 minutes to read the data block BX from medium #1=64 minutes in total.

In contrast, the time taken to read the entire data X (i.e., the data blocks AX and BX) from the data arrangement (i.e., the medium #2) illustrated on the right side of FIG. 5 is calculated to be:

2 minutes to change the medium in the drive to the medium #2+60 minutes to read the data blocks AX and BX from medium #2=62 minutes in total.

Namely, the data arrangement on the right side of FIG. 5 can reduce the number of times of changing the medium by one time as compared to the data arrangement on the left side of FIG. 5, which means the time taken to read the data can be reduced by two minutes.

The reduction of from 64 minutes to 62 minutes corresponds to a response time reducing rate of 2/64×100≈3%. In addition, the data arrangement of FIG. 5 duplicates data (i.e., the data blocks AX and BX) as much as a single media. Such duplicating of a large amount of data lowers the capacity efficiency to 2/3×100≈66.6%. Here, throughout the specification, a term "capacity efficiency" represents a ratio of an amount of data to be stored to a capacity actually used to store the data.

For example, description will now be made on the assumption that, as illustrated in FIG. 6, the data X being focused on occupies 5% of the respective media #0 and #1. Under this assumption, the time taken to read the entire data X (i.e., the data blocks AX and BX) from the data arrangement (i.e., the media #0 and #1) illustrated on the left side of FIG. 6 is calculated to be:

2 minutes to change the medium in the drive to the medium #0+3 minutes to read the data block AX from medium #0+2 minutes to change the medium in the drive to the medium #1+3 minutes to read the data block BX from medium #1=10 minutes in total.

In contrast, the time taken to read the entire data X (i.e., the data blocks AX and BX) from the data arrangement (i.e., the medium #2) illustrated on the right side of FIG. 6 is calculated to be:

2 minutes to change the medium in the drive to the medium #2+6 minutes to read the data blocks AX and BX from medium #2=8 minutes in total.

Namely, the data arrangement on the right side of FIG. 6 can reduce the number of times of changing the medium by one time as compared to the data arrangement on the left side of FIG. 6, which means the time taken to read the data can be reduced by two minutes.

Although both data arrangements of FIGS. 5 and 6 reduce the time by two minutes, the response time reducing rate of the data arrangements in FIG. 6 is 2/10×100=20%, which is larger than that of the data arrangement of FIG. 5. The capacity efficiency of the data arrangement of FIG. 6 is 2/2.1×100≈95.2%, which means that the reduction in the capacity efficiency of FIG. 6 is about 4.8%, which is not so large as compared with the reduction by 33.3% in the capacity efficiency of the data arrangement of FIG. 5. As the above examples, data having a smaller ratio to the entire data (data X in the above examples) more avoids reduction in capacity efficiency even undergoing duplication, and has higher effect of relatively reducing the time taken to obtain data due to reduction in the number of times of changing a medium.

(1-2) Overview of Arranging Data of the Second Embodiment

The method of arranging data of the second embodiment (to be detailed below) reduces the number of times of changing a medium, avoiding reduction in capacity efficiency, by using a duplicate originally generated for enhancing the reliability and contriving the data arrangement in respective media.

Figure 7:
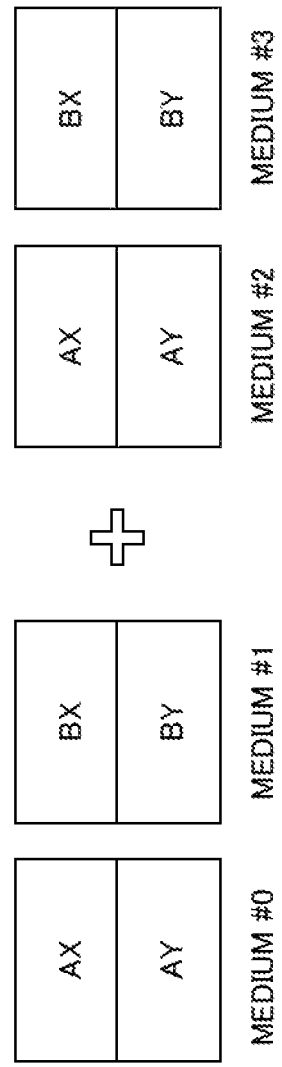
FIG. 7 is a diagram illustrating an overview of arranging data in which duplicate data blocks are generated and stored for enhancing reliability.

As one of the schemes to avoid data loss due to a failure in the storage device, a duplication of data is generated and then stored in another device (medium). For example, as illustrated in FIG. 7, duplications of the data blocks stored in the medium #0 and #1 are generated and stored into the medium #2 and #3, respectively. Such generating and storing of duplications of data can avoid data loss even if one of the media storing the same data blocks fails. In the example of FIG. 7, the data arrangement in the media #0 and #1 is the same as that in the media #2 and #3 and is both appropriate for the axis AB of obtaining data.

In contrast to the above, as illustrated in, for example, FIG. 8, the method of arranging data of the second embodiment to be detailed below arranges the duplications that is originally generated for enhancing the reliability in the media #2 and #3 considering the other axis XY of obtaining data different from the axis AB of obtaining data considered for the medium #0 and #1.

Figure 8:
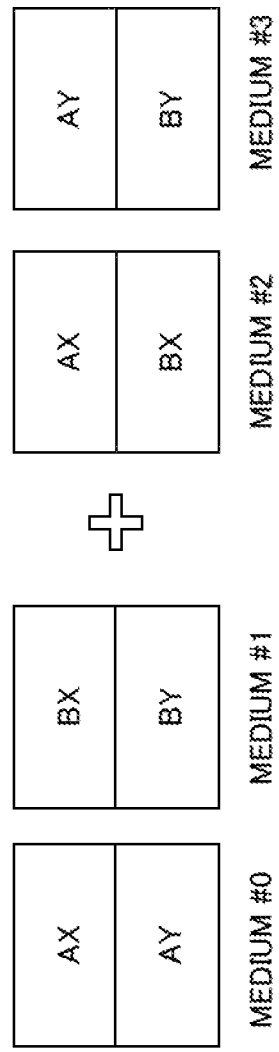
FIG. 8 is a diagram illustrating an overview of arranging and duplicating data including arranging duplicate data blocks originally generated for reliability and considering the axis of obtaining data, according to a second embodiment.

Here, FIGS. 7 and 8 illustrate the overviews of data arrangement of the second embodiment. In particular, FIG. 7 illustrates an example of data arrangement in the respective media #0-#3 in a typical method of duplication. In contrast, FIG. 8 illustrates an example of data arrangement of the duplicates of the data in media #0 and #1 in the media #2 and #3, considering the axis XY of obtaining data different from the axis AB of obtaining data considered for the medium #0 and #1.

The method of arranging data of the second embodiment retains data in two different arrangements (first arrangement and second arrangement). Specifically, as illustrated in FIG. 8, the second embodiment can provide data arrangements optimum for both axes AB and XY of obtaining data. This can reduce the number of times of changing a medium, so that the time taken to obtain data can also be reduced.

Since this method uses duplications originally generated for enhancing the reliability, the capacity efficiency is not declined for the purpose of reducing the number of times of changing a medium. In other words, the method of the second embodiment can reduce the time to obtain data without declining of the capacity efficiency simply by modifying the arrangement of duplications generated for enhancing the efficiency. Since the use of duplications makes it possible to avoid data loss when a failure in any one of the media occurs only once, the original object to enhance the reliability can also be attained.

(1-3) Overview of Arranging Data of the Third Embodiment

Figure 9:
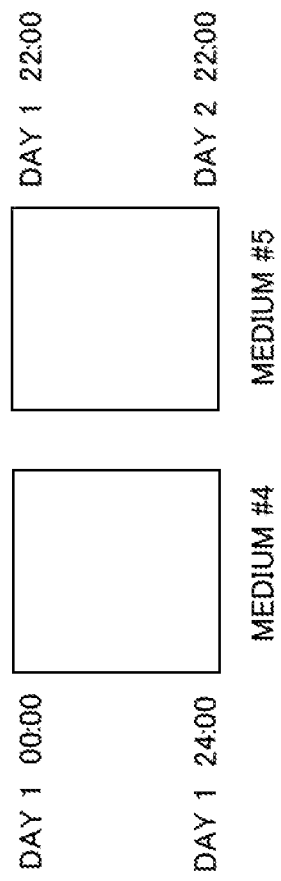
FIG. 9 is a diagram illustrating an overview of arranging and duplicating data in which data at an end portion of a medium is redundantly stored in the front or top portion of a subsequent medium, according to a third embodiment.

The method of arranging data of the third embodiment generates, as illustrated in the example of FIG. 9, a duplication of data (the time 22:00 to the time 24:00 of the first day) at the end portion of the antecedent medium #4 and arranges the duplication to the subsequent medium #5 in order to inhibit the generation of the need for changing a medium described above with reference to FIG. 4. Accordingly, 24-hour data from the time 22:00 of the first day to the time 22:00 of the second day is stored in the medium #5. If a medium subsequent to the medium #5 is present, a 24-hour data of from the time 20:00 of the second day to the time 20:00 of the third day is stored in the subsequent medium #6 (not illustrated). FIG. 9 illustrates the overview of the data arrangement of the third embodiment.

According to the method of arranging data of the third embodiment, in storing time-series data, such as log data, into multiple media, the data at the end portion of the antecedent medium is redundantly stored in the front (top) portion of the subsequent medium. Namely, in storing data like log data, the data arrangement of FIG. 9 is applied in place of that of FIG. 4.

This can abate unfairness to the time of obtaining data due to the time of generating data, and consequently, the well-balanced capacity efficiency and reduction in time taken to obtaining data can be achieved. Specifically, the example of FIG. 9 makes it possible to obtain the two-hour data from the time 23:00 of the first day to the time 1:00 of the second day, which means data across the boundary time (predetermined boundary) can be obtained from the medium #5 without the need for changing a medium.

Figure 10:
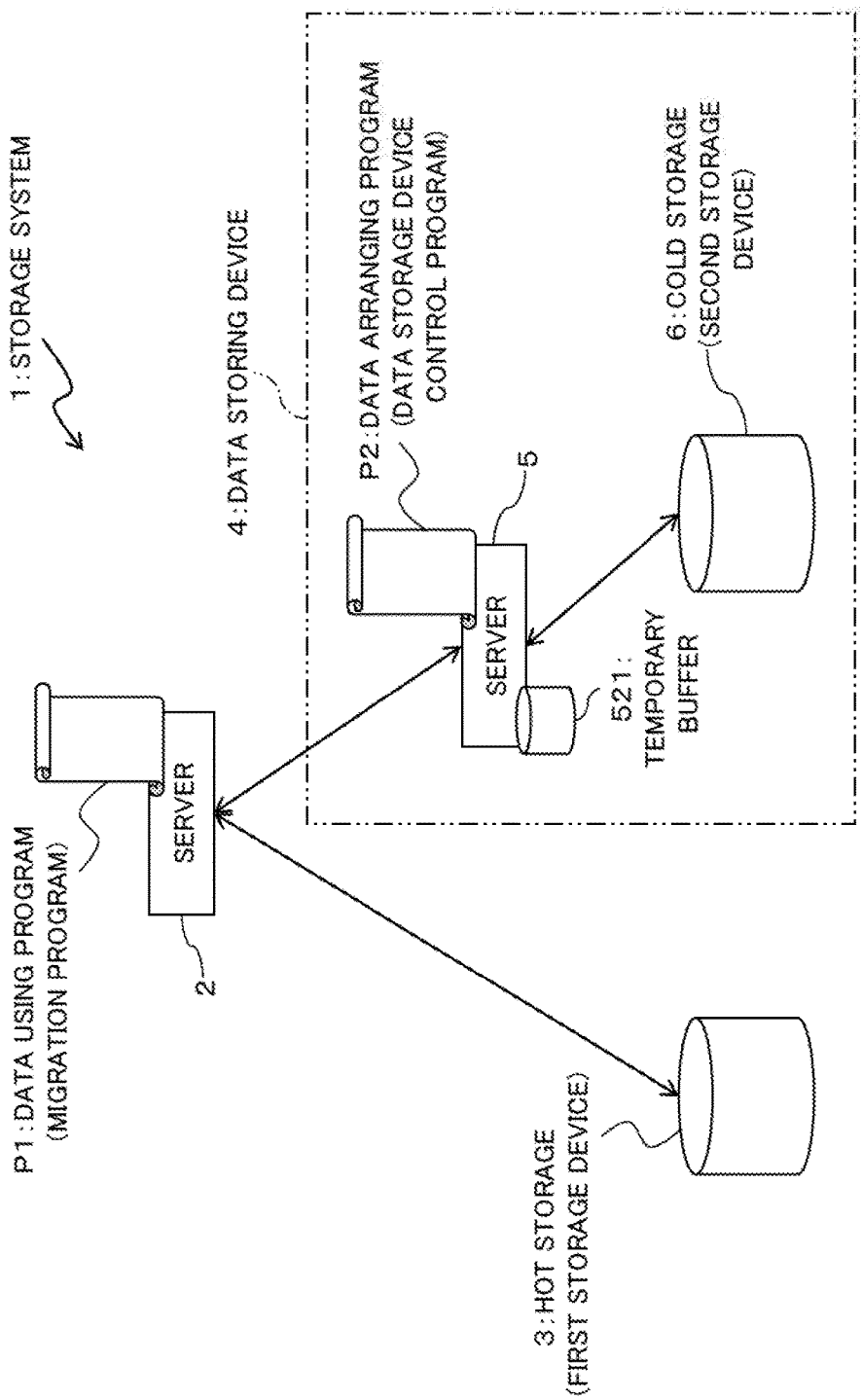
FIG. 10 is a block diagram schematically illustrating an example of the configuration of a storage system in the first to the third embodiments.

(2) The Configuration of the Storage System of the First to Third Embodiments The configuration of the storage system 1 of the first to the third embodiments will now be described with reference to FIG. 10. FIG. 10 is a block diagram schematically illustrating the example of the configuration of the storage system 1 of the first to the third embodiments. The storage system 1 of the first to the third embodiments includes a server 2, a hot storage 3, and a data storing device 4. The data storing device 4 of the first to the third embodiments includes a server 5 and a cold storage (e.g., a library device) 6.

The server (computer) 2 is communicably connected to the hot storage 3 and the server 5, and is communicably connected to the cold storage 6 via the server 5. The server 2 can access (i.e., use) data stored in the hot storage 3 and the cold storage 6 by executing the data using program (migration program) P1.

The hot storage (first storage device) 3 is high in both performance and cost, and is exemplified by an SSD or a HDD.

The cold storage (second storage device) 6 is an inexpensive storage not high in performance, and is exemplified by a tape storage or an optical storage device. The cold storage 6 includes one or more drives 61 (see FIG. 11) and multiple media 62 (see FIG. 11). The multiple media 62 correspond to an example of multiple media that store data having been stored in the hot storage 3. Examples of the medium 62 are a tape and an optical disk. The drive 61 accesses (writes/reads data into and from) the media 62. To the drive 61, a medium 62 that is to be accessed is carried by a magazine carrier (not illustrated).

The server 2 migrates data from the hot storage 3 to the cold storage 6 in accordance with the time of generating the data and/or the frequency of using the data by executing the data using program P1. Alternatively, the data migration may be achieved by executing a migration program by the server 2. The data migration by the server 2 is described below by referring to FIG. 16.

Data to be migrated from the hot storage 3 to the cold storage 6 by the server 2 is temporarily stored in a temporary buffer 521 of the server 5 and is then arranged and stored into a medium 62 of the cold storage 6 from the temporary buffer 521 by the server 5. For this purpose, the server (computer) 5 executes the data arranging program (data storage device control program) P2 to achieve an appropriate arrangement of each data block containing data to be stored in a medium 62. The appropriate method of arranging a data block into a medium 62 will be detailed in the following first to third embodiment.

In the first to the third embodiments, the server 5 interposed between the server 2 and the cold storage 6 executes the data arranging program P2 and thereby appropriately arranges each data block into a medium 62. However, the present invention is not limited to this. Alternatively, the server 5 may be omitted and the server 2, which executes the data using program P1, may also execute the data arranging program P2, so that each data block is appropriately arranged in the medium 62.

Figure 11:
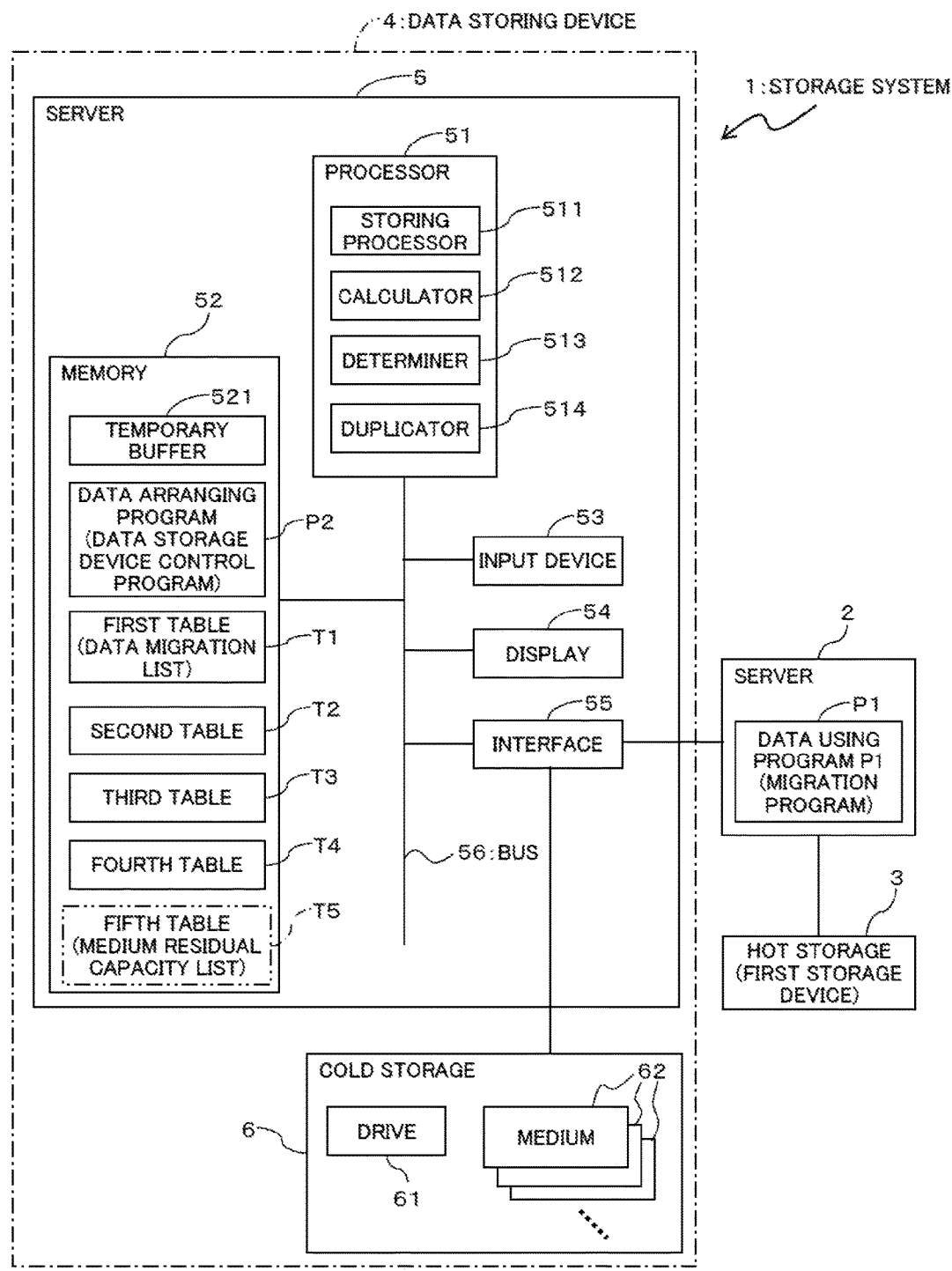
FIG. 11 is a block diagram schematically illustrating an example of the hardware configuration and the functional configuration of a data storage device in the first to the third embodiments.

(3) The Hardware and Functional Configurations of the Data Storage Device of the First to the Third Embodiments:

Description will now be made in relation to the hardware and functional configurations of the data storing device 4 (in particular, the server 5) of the first to the third embodiments with reference to FIG. 11. FIG. 11 is a block diagram schematically illustrating examples of the hardware and functional configurations of the data storing device 4 (in particular, the server 5) of the first to the third embodiments.

As illustrated in FIG. 11, the server (computer) 5 of the first to the third embodiments controls data arrangement into the media 62 of the cold storage 6, and includes a processor 51, a memory 52, an input device 53, a display 54, and an interface 55. The processor 51, the memory 52, the input device 53, the display 54, and the interface 55 are communicably connected to one another via a bus 56.

The processor 51 controls the entirety of the server 5. The processor 51 may be a single processor or a multiprocessor. An example of the processor 51 include a Central Processing Unit (CPU), a Micro Processing Unit (MPU), a Digital Signal Processor (DSP), an Application Specific Integrated Circuit (ASIC), a Programmable Logic Device (PLD), or a Field Programmable Gate Array (FPGA). Alternatively, the processor 51 may be a combination of two or more of a CPU, an MPU, a DSP, an ASIC, a PLD, and an FPGA.

The memory 52 includes a region for the temporary buffer 521 described above and also stores various pieces of data needed for processes by the processor 51. Examples of the various pieces of data are a first table T1, a second table T2, a third table T3, a fourth table T4, a fifth table T5, and programs. The programs may include an Operating System (OS) program and an application program that are executed by the processor 51. The application program may include the data arranging program (data storage device control program) P2 described above. The memory 52 may be a Random Access Memory (RAM) and an HDD, or a semiconductor storage device (Solid State Drive (SSD)) such as a flash memory. The first to the fifth tables T1-T5 will be detailed in the following first to third embodiments.

The program that the processor 51 is caused to execute may be stored in a non-transitory portable recording medium such as an optical disk, a memory device, or a memory card. The program stored in such a portable recording medium comes ready to be executed after being installed into the memory 52 under the control of, for example, the processor 51. Alternatively, the processor 51 may directly read the program from the portable recording medium and execute the program.

Here, an optical disk is a non-transitory portable recording medium in which data is readably recorded by means of reflection of light. Examples of the optical disk are a Blu-ray (registered trademark), a Digital Versatile Disc (DVD), a DVD-RAM, a Compact Disc Read Only Memory (CD-ROM), and a CD-R (Recordable)/RW (ReWritable). A memory device is a non-transitory recording medium having a function of communicating with a device connecting interface (not illustrated), and is exemplified by a Universal Serial Bus (USB) memory. A memory card is a card-type non-transitory recording medium that may be written or read data when connected to the processor 51 via a memory reader/writer (not illustrated). An optical disk serving as the medium 62 is the same as the optical disk described here.

The processor 51 of the first to the third embodiments functions as a storing processor 511, a calculator 512, a determiner 513, and a duplicator 514 that are to be detailed in the following first to third embodiments by executing the data arranging program P2.

The input device 53 is, for example, a keyboard and a mouse, and is operated by the user to issue various instructions to the processor 51. The mouse may be replaced with a touch panel, a tablet, a touch pad, or a track ball.

The display 54 is, for example, a display device using a Cathode Ray Tube (CRT) or a Liquid Crystal Display, and outputs and displays information related to various processes performed by the processor 51. In addition to the display 54, the server 5 may include an output device that outputs and prints information related to various processes performed by the processor 51.

The interface 55 receives and transmits data from and to the server 2 and cold storage 6 that are connected to the server 5 via respective networks.

The server 2 may include a processor, a memory, a input device, a display, an interface, and a bus the same as those included in the server 5.

(4) First Embodiment

Hereinafter, the first embodiment will now be described with reference to FIGS. 5, 6, and 11-23.

(4-1) The Functional Configuration of the First Embodiment

First of all, description will now be made in relation to a storing processor 511, a calculator 512, a determiner 513, and the duplicator 514 (see FIG. 11) that are achieved by the processor 51 executing the data arranging program P2 in the first embodiment.

The storing processor 511 stores data having been stored in the hot storage 3 into multiple media 62 of the cold storage 6. The data to be migrated from the hot storage 3 to the cold storage 6 by the server 2 is temporarily stored in the temporary buffer 521. Then the storing processor 511 arranges and stores the data in the temporary buffer 521 into the media 62 of the cold storage 6.

The calculator 512 calculates a ratio of each data block, which is classified according to multiple pieces (types) of dimension information (e.g., time and position) in data stored in two or more media #0 and #1 (see FIGS. 5 and 6) of the multiple media 62, to the data.

The determiner 513 determines, on the basis of the ratio of each data block by the calculator 512, whether a duplicate of the data block is to be generated. For example, the determiner 513 determines a data block having a calculated ratio equal to or less than a threshold (e.g., 10%) to be a data block to be duplicated, but determines a data block having a ratio more than the threshold not to be a data block to be duplicated (see FIGS. 5, 6, and 18).

The duplicator 514 generates a duplicate of a data block determined to be duplicated by the determiner 513 and stores the duplicated data block in another medium #2 except for the above media #0 and #1 among the multiple media 62.

Here, the description assumes that, as illustrated on the left sides of FIGS. 5 and 6, a data block is stored in the medium #0 (first medium) and the medium #1 (second medium) by the storing processor 511. In other words, the description here assumes that the first data block AX and the second data block AY are stored in the medium #0, and the third data block BX and the fourth data block BY are stored in the medium #1.

In the example on the left side of FIG. 5, the calculator 512 calculates ratios of the data X (i.e., the first data block AX and the third data block BX) to the respective media to be 50%. Since the calculated ratio of 50% is larger than the predetermined threshold of 10%, the determiner 513 determines the first data block AX and the third data block BX not to be data blocks to be duplicated. Accordingly, the duplicates of the first data block AX and the third data block BX classified into the first class data X are not generated (see the right side of FIG. 5).

Likewise, in the example on the left side of FIG. 5, the calculator 512 calculates ratios of the data Y (i.e., the second data block AY and the fourth data block BY) to the respective media to be 50%. Since the calculated ratio of 50% is larger than the threshold of 10%, the determiner 513 determines the second data block AY and the fourth data block BY not to be data blocks to be duplicated. Accordingly, the duplicates of the second data block AY and the fourth data block BY classified into the second class data Y are not generated (see the right side of FIG. 5).

In the example on the left side of FIG. 6, the calculator 512 calculates ratios of the data X (i.e., the first data block AX and the third data block BX) to the respective media to be 5%. Since the calculated ratio of 5% is smaller than the threshold of 10%, the determiner 513 determines the first data block AX and the third data block BX to be data blocks to be duplicated. Accordingly, the duplicator 514 generates the duplicates of the first data block AX and the third data block BX classified into the first class data X and stores the generated duplications into the medium #2 (see the right side of FIG. 6).

In the example on the left side of FIG. 6, the calculator 512 calculates ratios of the data Y (i.e., the second data block AY and the fourth data block BY) to the respective media to be 95%. Since the calculated ratio of 95% is larger than the threshold of 10%, the determiner 513 determines the second data block AY and the fourth data block BY not to be data blocks to be duplicated. Accordingly, the duplicates of the second data block AY and the fourth data block classified into the second class data Y are not generated (see the right side of FIG. 6).

(4-2) The Method of Arranging Data of the First Embodiment

Here, the method of arranging data of the first embodiment will now be detailed with reference to FIGS. 12-15, which illustrate tables T1-T4 of the first embodiment, respectively.

Into the data arranging program P2 executed by the server 5, a data migration list containing data (data blocks) to be migrated from the hot storage 3 to the cold storage 6 determined by the migration program P1 of the server 2 is input. An example of the data migration list is a first table T1 illustrated in FIG. 12.

In the first table T1, a data identification (ID) that identifies the data (data block) to be migrated, the data (data block), and the classification that the data belongs to are associated with one another. An example of a data ID is a file name or a block address, and is denominated to be 0, 1, 2, 3, . . . in the example of FIG. 12. The classification of each data block may be determined by the data using program P1 of the server 2 or by the data arranging program P2 of the server 5. The data is temporarily stored in the temporary buffer 521 of the server 5 and then stored in the medium 62 of the cold storage 6 by the storing processor 511.

Before a data block is first stored into the cold storage 6, a reference retrieval axis is determined. In any case, at least one data block is stored into the medium 62 via the temporary buffer 521. Specifically, in the example of FIGS. 5 and 6 having two axes AB and XY of obtaining data, determination is made as to which one of the axes AB and XY is a reference retrieval axis. If the axis AB of obtaining data is determined to the reference retrieval axis, a data block along the axis AB of obtaining data is certainly stored in a medium 62 and the duplicate of a data block along the axis XY of obtaining data is generated and stored in a medium 62 according to need. In contrast to the above, if the axis XY of obtaining data is determined to the reference retrieval axis, a data block along the axis XY of obtaining data is certainly stored in a medium 62 and the duplicate of a data block along the axis AB of obtaining data is generated and stored in a medium 62 according to need. The axis of obtaining data that a data block that is to be certainly stored in the medium 62 belongs to is referred to as the reference retrieval axis.

Here, the reference retrieval axis is determined in the following manner through the execution of the data arranging program P2 by the server 5. Specifically, the reference retrieval axis is determined basically depending on which axis of obtaining data is used at the highest frequency. If the number of times of retrieval along the axis AB of obtaining data is larger than that along the axis XY of obtaining data, the data AB of obtaining data is determined to be the reference retrieval axis. If the frequency of using the axis AB of obtaining data is the same as that of the axis XY of obtaining data or if the frequency of using each axis of obtaining data is not known, the reference retrieval axis is determined such that an amount of data to be duplicated comes to be minimum. In this case, a data block to be duplicated is determined in the manner to be detailed below with reference to FIG. 18.

In the example of FIG. 6, two axes AB and XY of obtaining data are present and the axis AB of obtaining data is determined to be the reference retrieval axis. In this case, data to be duplicated is selected from the data X and the data Y along the axis XY of obtaining data not determined to be the reference retrieval axis. In the example of FIG. 6, the data X (i.e., the data blocks AX and BX) is determined to be the data to be duplicated. This means that the reference retrieval axis is the axis AB of obtaining data and the data to be duplicated is determined to be the data X (the data blocks AX and BX). Specifically, since the data blocks AX and AY are stored in the medium #0 to store the data A and the data blocks BX and BY are stored in the medium #1 to store the data B, all the data pieces A, B, X, and Y are each certainly stored in the form of at least one piece in the media 62. In addition to the above, a medium #2 is prepared to store the data X, and duplicates of the data blocks AX and BX are stored in the medium #2. In contrast, a medium to store the data Y (the data blocks AY and BY) is not prepared because the data Y is not data to be duplicated, and the duplicates of the data blocks AY and BY are not generated.

As described above, the reference retrieval axis is determined on the basis of the data migration list T1 (see FIG. 12) input from the server 2 and then a data block to be duplicated is determined. The result of determining a data block to be duplicated is managed in the second table T2 as denoted in FIG. 13 by the server 5 (the data arranging program P2).

Here, a data block to be duplicated is determined in accordance with whether the ratio of each data block to the entire medium (all the data) is equal to or less than the predetermined threshold (e.g., 10%). Namely, a data block having a ratio equal to or less than the predetermined threshold is determined to be a data block to be duplicated while a data block having a ratio larger than the threshold is determined not to be a data block to be duplicated. As illustrated in the example of FIG. 6, when the ratios of data blocks each classified into the first class data A and the second class data B are both 50%, the ratio of a data block containing the data X is 5%, and the ratio of a data block classified into the second class data Y is 95%, the data X is determined to be the data to be duplicated. The data Y is not duplicated since duplicating the data Y largely reduces the capacity efficiency and has a small response time reducing ratio. Consequently, the data blocks classified into AX and AY are stored in the medium #0; the data blocks classified into BX and BY are stored in the medium #1; and the duplicates of the data blocks classified into AX and BX are stored in the medium #2.

Figure 13:
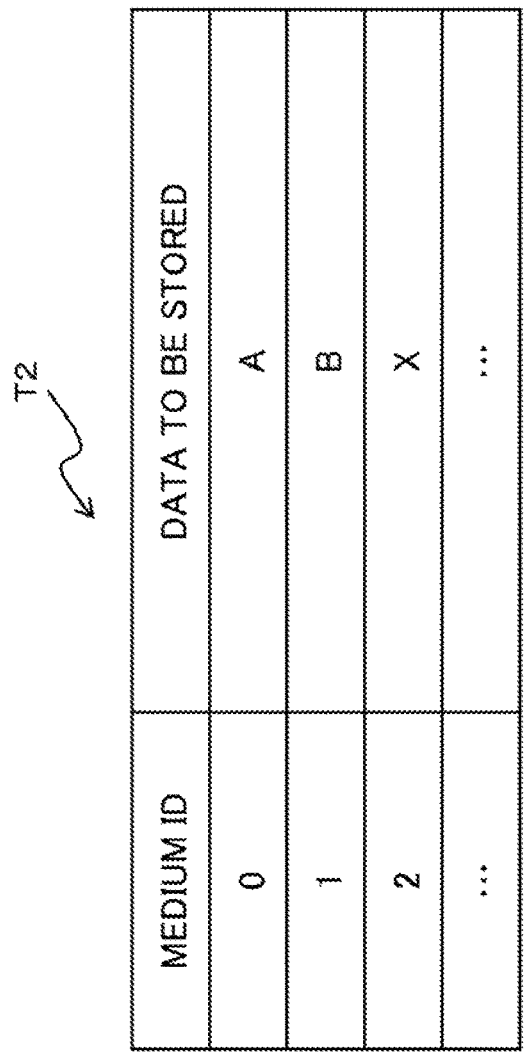
FIG. 13 is a diagram illustrating an example of a second table of the first embodiment.

When the data to be duplicated is determined in the above manner, the second table T2 as denoted in FIG. 13 is generated. The result of determining the data to be duplicated, which means that data to be stored in (to be associated with) each medium (i.e., information related to data to be stored in each medium) is understood and managed with reference to the table T2. The second table T2 denoted in FIG. 13 associates a medium ID and data to be stored in the medium specified by the medium ID with each other. Furthermore, in the second table T2 of FIG. 13, since data A, B, and X are allocated to the media #0, #1, and #2, respectively, the data blocks AX and AY are stored in the medium #0; the data blocks BX and BY are stored in the medium #1; and the data blocks AX and BX are stored in the medium #2.

In the second table T2, the medium IDs of the media #0, #1, #2, . . . are denominated by 0, 1, 2, . . . , respectively. When each medium comes to be full of data to be stored therein, a subsequent medium is assigned to the data in question. For example, if the media #0 is full of the data A, the data A is registered as the data to be stored in the medium #3 in the second table T2.

Various methods can be applied to the determining a data block to be duplicated. Examples of the method are ones that previously determine a threshold for the ratio of a data block and determines a data block to be duplicated on the basis of the threshold (see FIG. 18); and one that determines a data block to be duplicated by collectively considering three factors of the frequency of obtaining data (the frequency of retrieval), a degree of decline of the capacity efficiency, and a response time reducing rate (see FIG. 19). The latter method is based on the fact that arranging a duplication of data having a higher frequency of obtaining data largely affects the response time reducing rate. These methods will be detailed below by referring to FIGS. 18 and 19.

Here, data is written into the media 62 of the cold storage 6 by the storing processor 511 when some amount of data is accumulated in the temporary buffer 521. Such data writing when some amount of data is accumulated can keep the minimum number of times of changing a medium. For this purpose, data in the form of the third table T3 denoted in FIG. 14 is stored in the temporary buffer 521 until the data is written from the temporary buffer 521 into the media 62.

Figure 14:
FIG. 14 is a diagram illustrating an example of a third table of the first embodiment.

In the third table T3 of FIG. 14, the data ID that identifies data (data block) to be stored, the data (data block), and a medium ID that identifies a medium that is to store the data are associated with one another. Data is stored from the temporary buffer 521 to the media on the basis of the third table T3 of FIG. 14 in the following manner.
Specifically, the data having a data ID 0 (data block AX; see FIG. 12) is stored in the media #0 and #2; the data having a data ID 1 (data block BY; see FIG. 12) is stored in the medium #1; the data having a data ID 2 (data block AY; see FIG. 12) is stored in the medium #0; and the data having an data ID 3 (data block BX; see FIG. 12) is stored in the media #1 and #2.

Furthermore, in the first embodiment, even after data is written into the media 62, the data ID of the data (data block) stored in the media 62 is managed to achieve data obtaining (access to read data) in response to an instruction from the server 2. For example, the fourth table T4 denoted in FIG. 15, in which a medium ID of each medium and the data ID of the data stored in a medium identified by the medium ID are associated with each other, is stored in the memory 52.

Figure 15:
FIG. 15 is a diagram illustrating an example of a fourth table of the first embodiment.

The server 5 (function of data obtaining/function of data reading) can read the data blocks having data IDs 0, 2, . . . from the medium #0 by referring to the fourth table T4 of FIG. 15; and read the data blocks having data IDs 1, 3, . . . from the medium #1; and read the data having data IDs 0, 3, . . . from the medium #2.

For the last, description will now be made in relation to the operation performed to obtain data (access to read data) in response to an instruction from the server 2. The data arranging program P2 of the server 5 retrieves, upon receipt of a list (not illustrated) of data IDs of data to be obtained from the data using program P1 of the server 2, a medium containing the largest number of data IDs listed in the list from the fourth table T4. If the retrieval finds a single medium that contains all the data in the list, all the data can be obtained after a medium is changed only once. If a medium that contains all the data in the list is not found, the data arranging program P2 of the server 5 needs two or more times of changing a medium to obtain all the data in the list.

(4-3) Process Flow of the Method of Arranging Data of the First Embodiment

Description will now be made in relation to process flow (operations) of the method of arranging data of the first embodiment with reference to the flow diagrams of FIGS. 16-21.

Figure 16:
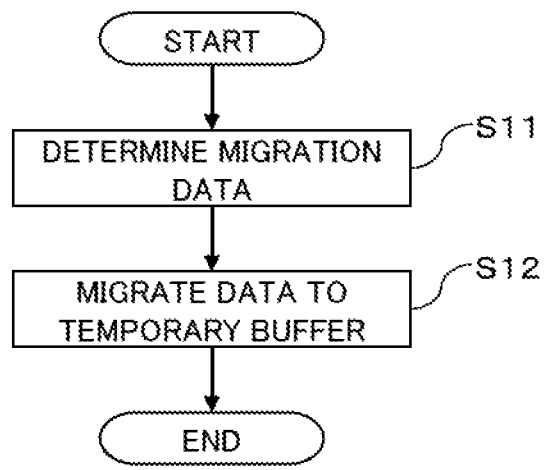
FIG. 16 is a flow diagram denoting a succession of procedural steps performed by a migration program of the first embodiment.

First of all, description will now be made in relation to the operation of the migration program (data using program) P1 of the first embodiment along the flow diagram of FIG. 16 (steps S11 and S12). When the server 2 starts the execution of the migration program P1, a data block (migration data) that is to be migrated from the hot storage 3 to the cold storage 6 is determined in accordance with, for example, an access frequency (step S11).

Figure 12:
FIG. 12 is a diagram illustrating an example of a first table of the first embodiment.

After migration data is determined, the migration data is migrated from the server 2 to the temporary buffer 521 of the server 5 in the form of the first table (data migration list) T1 of FIG. 12 (step S12). The first table (data migration list) T1 is generated by the migration program P1 in the server 2.

Figure 17:
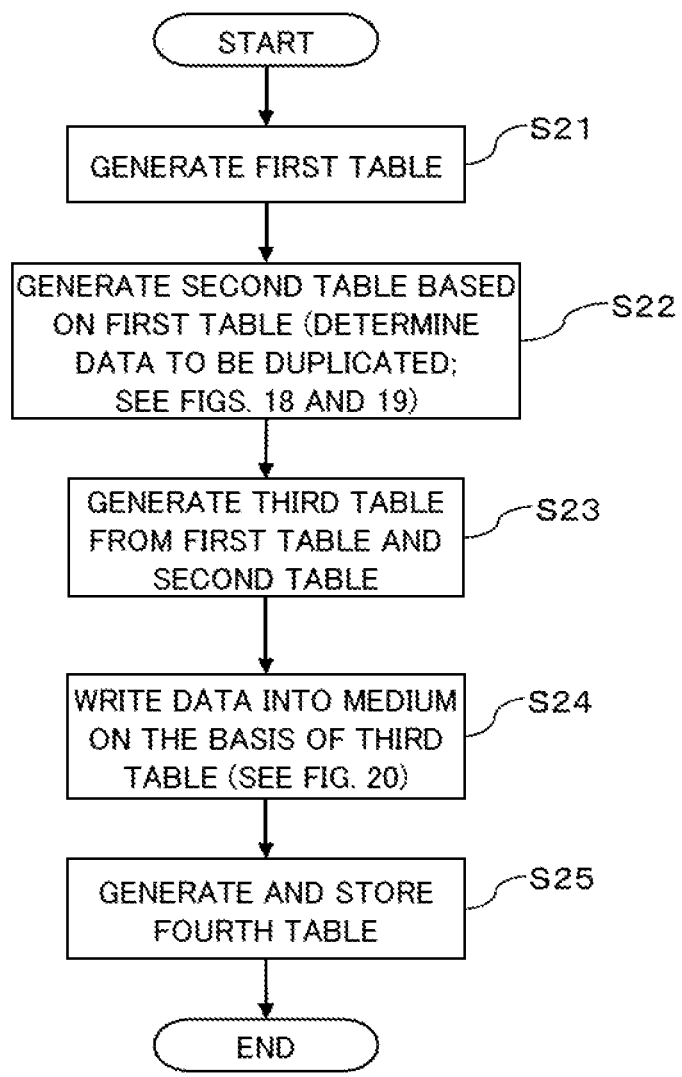
FIG. 17 is a flow diagram denoting a succession of procedural steps performed by a data storage device control program of the first embodiment.

Description will now be made in relation to the operation of the data arranging program (data storing device control program) P2 of the first embodiment along the flow diagram FIG. 17 (steps S21-S25). When the server 5 starts the execution of the data arranging program P2, the first table T1 illustrated in FIG. 12 is generated (step S21).

If classifications in the first table T1 are determined by the data using program P1 of the server 2, the data migration list input from the server 2 is used as the first table T1 without modifying the form of the first table. In contrast, if classifications in the first table T1 are determined by the data arranging program P2 of the server 5, a data migration list which associates data ID with data is input into the server 5.

Then, the reference retrieval axis is determined on the basis of the first table (data migration list) T1, a data block to be duplicated is determined, and the second table T2 illustrated in FIG. 13 is generated. The result of determining data to be duplicated (i.e., a data block to be duplicated) is managed by the second table T2 (step S22). The operation of determining data to be duplicated in step S22 will be detailed below with reference to FIGS. 18 and 19.

After that, the third table T3 denoted in FIG. 14 is generated on the basis of the first table T1 and the second table T2 (step S23). Until data blocks to be stored are written from the temporary buffer 521 to the media 62 with reference to the third table T3, the data blocks to be stored are temporarily stored in the temporary buffer 521.

After that, the data blocks to be stored, which are being stored in the temporary buffer 521, are written into the media 62 on the basis of the third table T3 and stored in the media 62 (step S24). Consequently, as illustrated in FIG. 6, the data block AX is stored in the media #0 and #2; the data block BY is stored in the medium #1; the data block AY is stored in the medium #0; and the data block BX is stored in the media #1 and #2. The operation of writing data blocks in step S24 will be detailed below with reference to FIG. 20.

After the data blocks are written into the media 62, the fourth table T4 denoted in FIG. 15 that manages data IDs of data blocks stored in the media 62 is generated and stored so that data can be obtained in response to an instruction from the server 2 (step S25). The operation of obtaining data on the basis of the fourth table T4 will be detailed below with reference to FIG. 21.

Here, description will now be made in relation to an example of an operation of determining a data block to be duplicated of the first embodiment carried out in step S22 of FIG. 17 along the flow diagram FIG. 18 (steps S31 and S32). The example of FIG. 18 previously determines a threshold of a ratio of a data block and determines a data block to be duplicated on the basis of the threshold.

Figure 18:
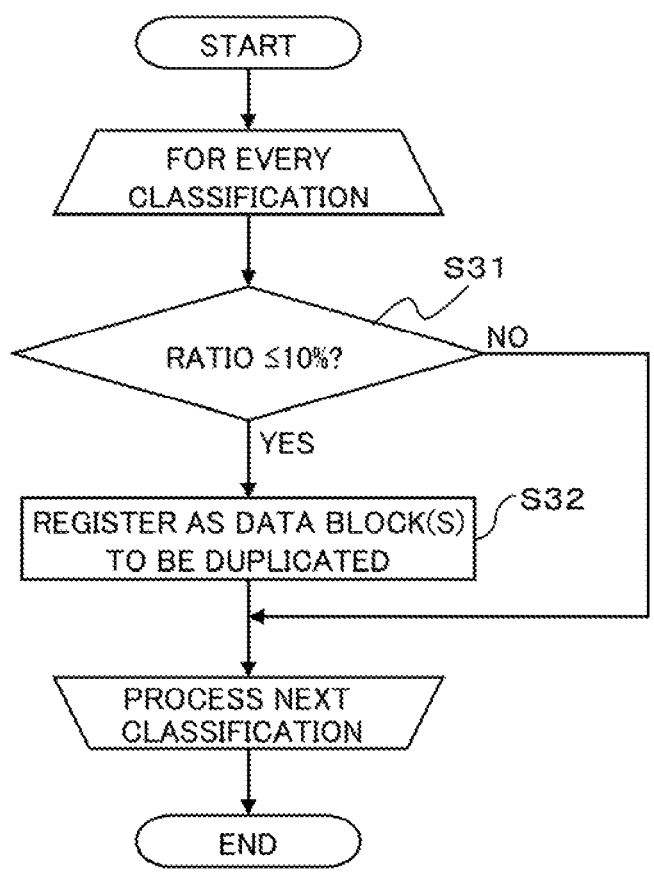
FIG. 18 is a flow diagram denoting an example of a succession of procedural steps of determining a data block to be duplicated of the first embodiment.

In the example of FIG. 18, the process of steps S31 and S32 is performed on all the classifications of the data blocks. For example, with respect to the axis XY of obtaining data not determined to be the reference retrieval axis (axis AB of obtaining data), a determination is made, for example, as to whether the ratios of X and Y to the entire data is equal to or less than the threshold (e.g., 10%) (step S31). If the ratios exceed the threshold (NO route in step S31), the next classification is to be processed. If the ratios are equal to or less than the threshold (YES route in step S31), the data blocks (e.g., AX and BX) are determined to be data blocks to be duplicated and are registered into the second table T2 or the like (step S32). Then, the next classification is to be processed.

When the reference retrieval axis is determined on the basis of the largeness of the amount of data to be duplicated as above, for every axis (e.g., AB and XY) of obtaining data, data blocks, which are to be duplicated on the assumption that the corresponding axis of obtaining data is not determined to be the reference retrieval axis, is determined. Then, the axis that provides a smaller amount of data to be duplicated than another axis is determined to be the reference retrieval axis. In the above example, the data A and B along the axis AB of obtaining data is not to be duplicated, which means the ratio of the data to be duplicated to the entire data is 0%, while the data X and Y along the axis XY duplicates only the data X, which means the ratio of the data to be duplicated to the entire data is 5%. Accordingly, the axis XY of obtaining data is determined to be the reference retrieval axis.

Description will now be made in relation to another example of an operation of determining a data block to be duplicated of the first embodiment carried out in step S22 of FIG. 17 along the flow diagram FIG. 19 (steps S41-44). The example of FIG. 19 determines a data block to be duplicated by collectively considering three factors of the frequency of obtaining data, a degree of decline of the capacity efficiency, and a response time reducing rate.

Figure 19:
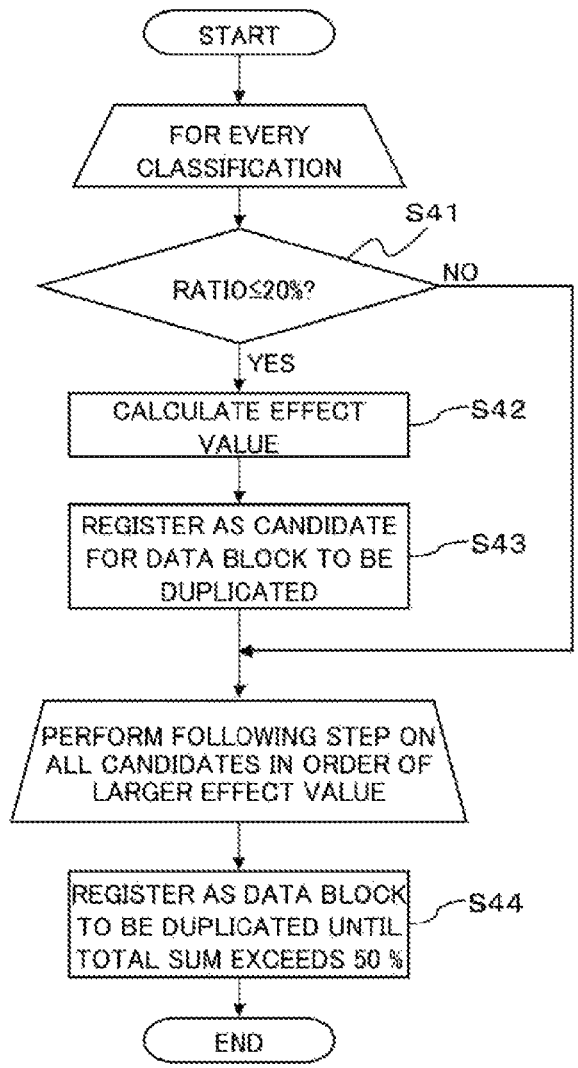
FIG. 19 is a flow diagram denoting another example of a succession of procedural steps of determining a data block to be duplicated of the first embodiment.

In the example of FIG. 19, the effect value is defined and calculated in the following expression (1).

$$[\text{effect value}] = (\text{frequency}) * (100 - [\text{ratio of data (\%)}]) / 100 * [\text{response time reducing rate}] \quad (1)$$

The process of steps S41-S43 is carried out on every classification of data blocks. First of all, data is filtered depending on the ratio of data of each classification like the example of FIG. 18. Although the predetermined threshold of the example of FIG. 18 is set to be 10%, the predetermined threshold in FIG. 19 is set to be slightly larger (e.g., 20%) than that of the example of FIG. 18.

A determination is made as to whether the ratio of each classification to the entire data is equal to or less than the threshold (step S41). If the ratio exceeds the threshold (NO route in step S41), the next classification is to be processed. On the other hand, if the ratio is equal to or less than the threshold (YES route in step S41), the effect value of the classification is calculated using the expression (1) (step S42), and the classification is registered to be a candidate for the data to be duplicated in association with the calculated effect value (step S43). Then, the process is to be performed on the next classification.

When the process of steps S41-S43 is performed on all classifications, the process of step S44 is carried out on all the registered candidates for the data to be duplicated in the order of having larger effect values. Specifically, in step S44, the effect values calculated for the respective candidates for the data to be duplicated are accumulated in the order of being larger and the candidates (classifications) are registered to be the data to be duplicated until the sum of the amount of data exceeds a threshold (e.g., 50%). At the time when the sum of the accumulation exceeds 50%, the process of step S44 ends.

The above expression (1) is defined such that the effect value becomes larger when the frequency of retrieval (the frequency of obtaining data) is higher, a degree of decline of the capacity efficiency is lower, and a response time reducing rate (relative reduced time) is larger. The maximum value of the ratio of a data amount is 100%, and the expression (1) multiples (100−[ratio of data (%)])/100, so that data having a smaller amount and a smaller degree of declining the capacity efficiency is preferentially duplicated. Further, since the data to be duplicated needs to be narrowed in exchange for widening the threshold in step S41, the threshold of the total value of the data amount is set to be slightly smaller, for example, 50%.

Alternatively, the following expression (2) may be used which calculates the effect value by adding in place of the above expression (1), which calculates the effect value by multiplying. In the calculation using the expression (2), respective weights $\alpha$, $\beta$, and $\gamma$ may be assigned to the terms.

$$[\text{effect value}] = \alpha * [\text{frequency}] + \beta * (100 - [\text{ratio of data (\%)}]) / 100 + \gamma * [\text{response time reducing rate}] \quad (2)$$

Such weighting sets a term in the expression to be highly regarded. If the frequency is to be highly regarded, the weights of $\alpha=1$, $\beta=0.5$, and $\gamma=0.5$ are set.

Here, description will now be made in relation to an operation of writing data into the medium 62 performed in step S24 of FIG. 17 along the flow diagram FIG. 20 (steps S51-S55). In order to minimize the number of times of changing a medium, data writing from the temporary buffer 521 to the media 62 is carried out in such a manner that data to be written into the same medium is sequentially written all at once. For this purpose, in data writing, the third table T3 of FIG. 14 is confirmed and after the data having a certain data ID was successively written into all media 62 that are to store the same data, the entry associated with the data ID is deleted from the third table T3. If the data still needs to be written into another medium 62, the entry associated with the medium ID corresponding to a medium to which the data is already written is deleted from the entry associated with the data ID.

Figure 20:
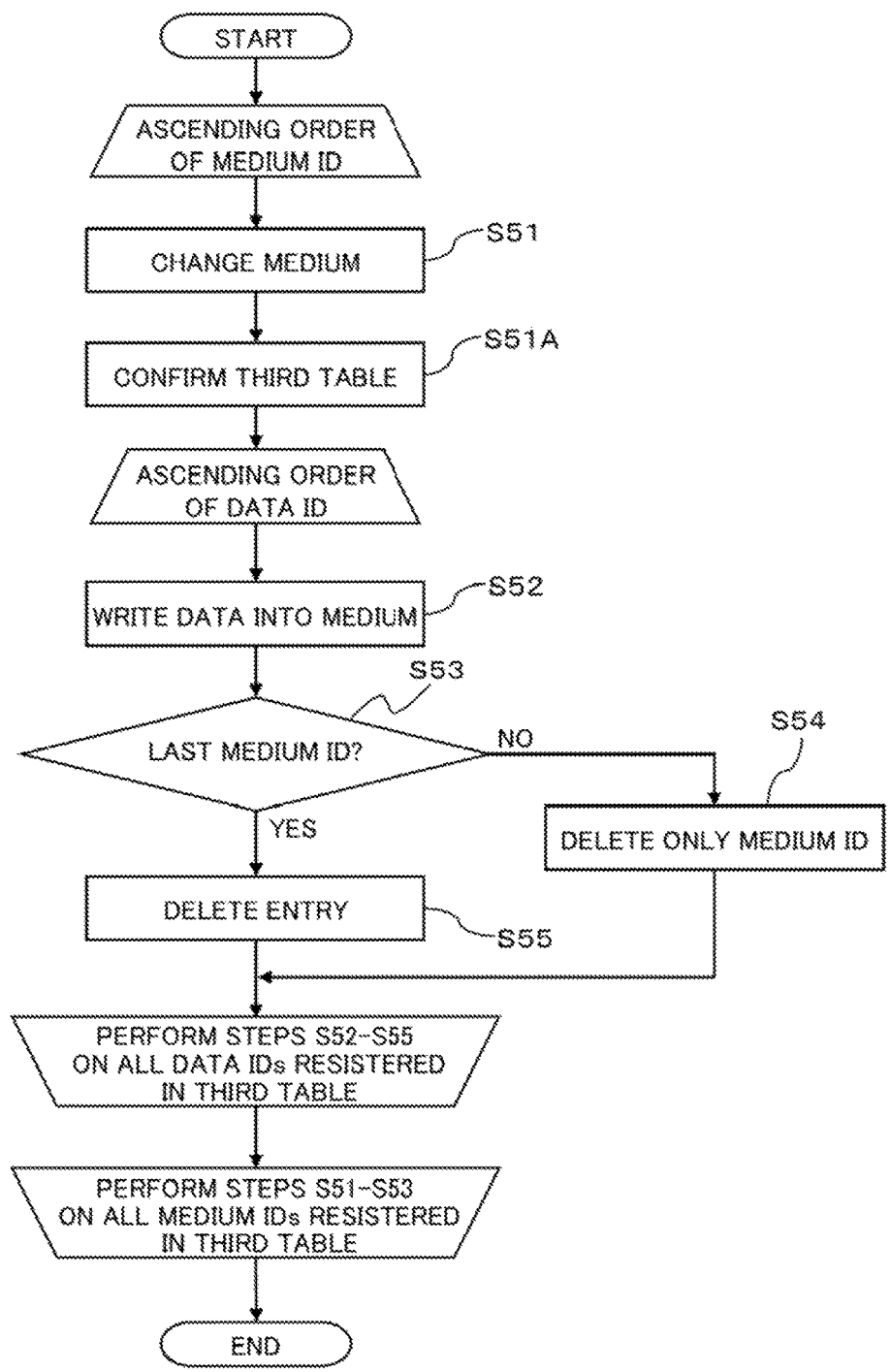
FIG. 20 is a flow diagram denoting a succession of procedural steps of writing data into a medium of the first embodiment.

Specifically, in the example of FIG. 20, the process of steps S51-S55 are carried out on each medium 62 in the ascending order of the medium ID. First of all, the medium 62 placed in the drive 61 is changed to a medium 62 having the minimum medium ID (step S51); the third table T3 is confirmed (step S51A); and a process of steps S52-S55 is carried out on each data (each data block) in the ascending order of data ID in the third table T3.

In step S52, the data to be stored in the medium 62 is written into the medium 62 in the ascending order of the data ID. After the writing, a determination is made whether the medium ID of the medium 62 is the last medium ID registered in the third table T3 (step S53). If the medium ID is not the last (NO route in step S53), only the medium ID to which data writing is completed is deleted from the entry of the corresponding data ID (step S54). In contrast, if the medium ID is the last (YES route in step S53), the entry of the corresponding ID is deleted from the third table T3 (step S55).

The process of steps S52-S55 is carried out on all the data IDs registered in the third table T3. The process of steps S51-S55 is carried out on all the medium IDs registered in the third table T3.

Figure 21:
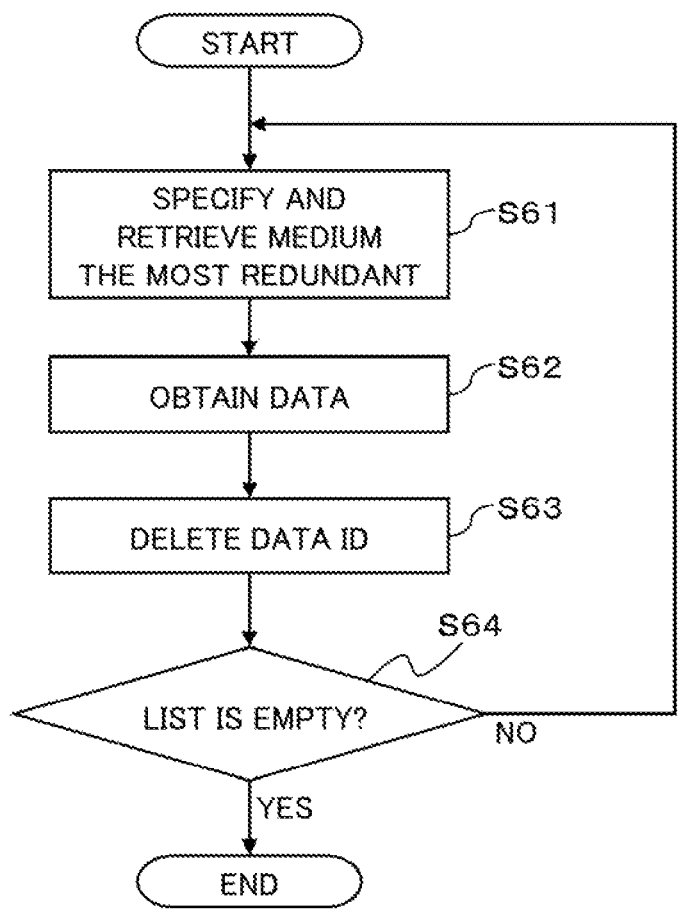
FIG. 21 is a flow diagram denoting a succession of procedural steps of obtaining data from a medium of the first embodiment.

Description will now be made in relation to an operation of obtaining data from the medium 62 of the first embodiment along the flow diagram FIG. 21 (steps S61-S64).

First of all, a list being input from the server 2 and assigning a data ID of data that is to be obtained is compared with the fourth table T4. A medium ID associated with data IDs in the fourth table T4 that most coincide (are the most redundant) with data IDs in the compared list is searched and specified.

The specified medium 62 is brought to and placed in the drive 61 (step S61), and data assigned by the list is obtained from the medium 62 (step S62). Then, the data ID of the obtained data is deleted from the list (step S63).

The process of steps S61-S63 is repeated until data specified by all the data IDs registered in the list is obtained, in other words, until the list is determined to be empty in step S64. If the list is determined not to be empty in step S64 (NO route), the process returns to step S61. In contrast, if the list is determined to be empty in step S64 (YES route), the process ends.

(4-4) Effects of the First Embodiment

Figure 22:
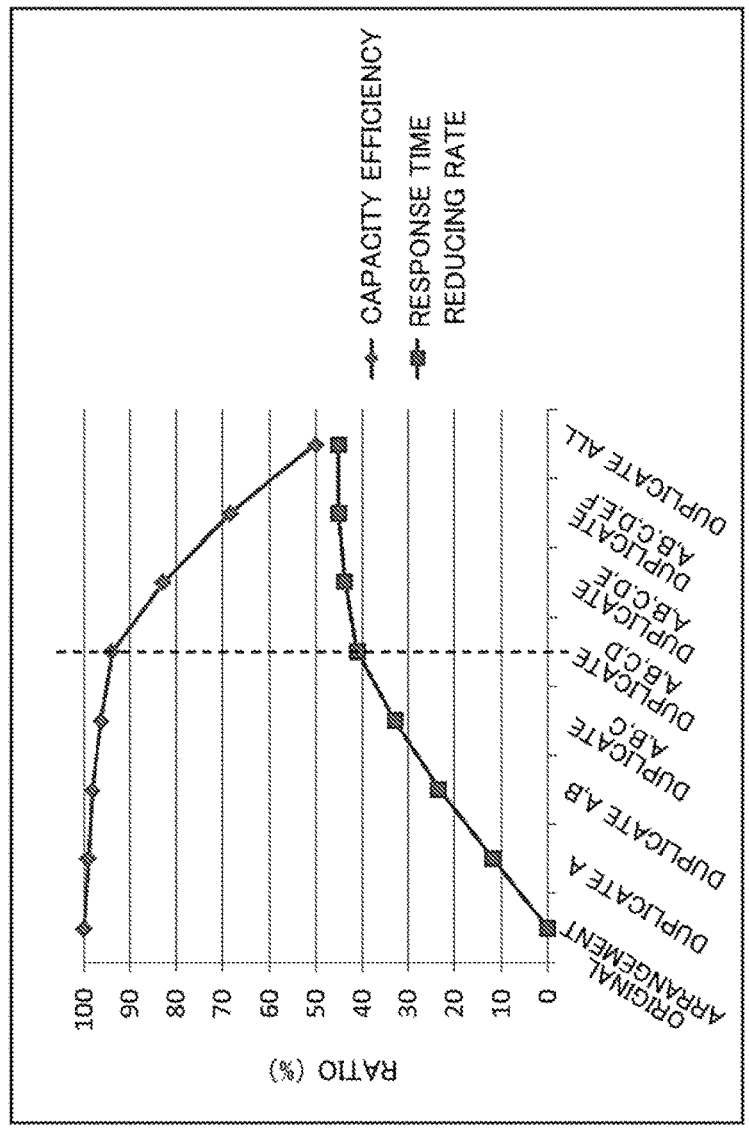
FIG. 22 is a graph depicting the relationship between a capacity efficiency and a response time reducing rate when the first embodiment is applied to sample data of a certain axis of obtaining data.

FIG. 22 exhibits the relationship between a capacity efficiency and a response time reducing rate (relative reducing time) when the method of arranging data of the first embodiment is applied to sample data of a certain axis of obtaining data. The sample data is assumed to be along axis of obtaining data containing six types of data A, B, C, D, E, and F, and the distribution of the ratios of the respective types of data to the entire data focusing on the axis of obtaining data is depicted in FIG. 23. The item "others" in FIG. 23 represents a ratio of remaining data of the type G and the types subsequent to the type G, i.e., the types except the types A-F, to the entire data.

The result of simulation that assumes that the data is obtained under classifications A-F, and data of type G and the types subsequent to the type G is not obtained, is denoted in FIG. 22. Specifically, the simulation calculates the response time reducing rate (relative reducing time) of a case where data is equally arranged in 14 original media, and as illustrated in FIG. 22, a type of data being nearer the type A and having a smaller ratio can achieve a larger response time reduction rate (relative reducing time), inhibiting decline of the capacity efficiency. If the types A, B, C, and D are determined to be data to be duplicated, the response time reduction rate (relative reducing time) of 41% can be achieved at the cost of decline of capacity efficiency of 6.3%.

According to the method of arranging data of the first embodiment, duplicating data blocks having small ratios focusing on the response time reducing rate can achieve well-balanced capacity efficiency and data obtaining time. In other words, appropriate arrangement of duplication of data can reduce the number of times of changing a medium, suppressing decline of the capacity efficiency and further shortening the time taken to obtain data.

(4-5) Modification to the First Embodiment

The above first embodiment assumes to have two types of data along each axis of obtaining data, but the present invention is not limited to this. The present invention can be applied to cases where an axis of obtaining data has three or more types of data, and this alternative can also obtain the same effects as those of the first embodiment. Even if the axis AB of obtaining data includes five types of data A, B, C, D, and E, the configuration and the method of managing data of the storage system 1 are unchanged from those of the first embodiment.

The above first embodiment assumed that there were the two axes of obtaining data, but the present invention is not limited to this. Alternatively, the present invention can be applied to cases where three or more axes of obtaining data are present and can obtain the same effects as those of the first embodiment. For example, when data contains an axis PQ in addition to the axes AB and XY, each data blocks are classified into eight patterns and this case is different from the first embodiment only in the point that, in the third table T3, a single data block is stored in three media at the maximum. However, the configuration and the method of managing data are not largely different from those of the first embodiment.

(5) Second Embodiment

Here, description will now be made in relation to the functions of the storing processor 511 and the duplicator 514 that are achieved by the processor 51 executing the data arranging program P2. Differently from the first embodiment, the second embodiment does not carry out processes of calculating the ratio by the calculator 512 or making the determination based on the ratio by the determiner 513.

In place of these processes, the second embodiment generates duplicates to enhance the reliability and stores the duplicates into the media 62. For this purpose, a second table T2 (see FIG. 26) in which the arrangement of data which is the source of the duplicates and the arrangement of the duplicates are contrived in order to reduce the number of times of changing a medium without declining the capacity efficiency. Then, the medium (storing medium) 62 that is to store the duplicate is determined and the duplicate data block is stored into the storing medium 62.

Like the first embodiment, the storing processor 511 of the second embodiment stores data having been stored in the hot storage 3 into the multiple media 62 in the cold storage 6. In this event, data to be migrated from the hot storage 3 to the cold storage 6 by the server 2 is temporarily stored in the temporary buffer 521. Then the storing processor 511 arranges and stores the data in the temporary buffer 521 into the media 62 of the cold storage 6.

The duplicator 514 of the second embodiment duplicates the data blocks stored in two or more media #0 and #1 (see left side of FIG. 8) and stores the duplicates into the two or more medium #2 and #3 except for the media #0 and #1 (see right side of FIG. 8). At that time, the duplicator 514 generates and arranges the duplicates into the two media #2 and #3 such that the arrangement (first arrangement) of the data blocks classified in multiple pieces of dimension information (time, position) in the two or more media #0 and #1 is different from the arrangement (second arrangement) of the duplications of the data blocks into the two or more media #2 and #3.

Description will now be made in relation to a case where the storing processor 511 stores data blocks into the medium #0 (first medium) and the medium #1 (second medium) as illustrated on the left side of FIG. 8. Specifically, a case is described where the first data block AX and the second data block AY are stored in the medium #0 and the third data block BX and the fourth data block BY are stored in the medium #1. This case also assumes that the duplicates of these data blocks are stored into the medium #2 (third medium) and the medium #3 (fourth medium).

In the second embodiment, the duplicator 514 stores and arranges the duplications of the first data block AX and the third data block BX into the media #2 and stores and arranges the duplications of the second data block AY and the fourth data block BY into the media #3. This arranges the duplications of the media #0 and #1 in the media #2 and #3 considering the axis XY of obtaining data, different from the axis AB of obtaining that the media #0 and #1 consider.

Figure 24:
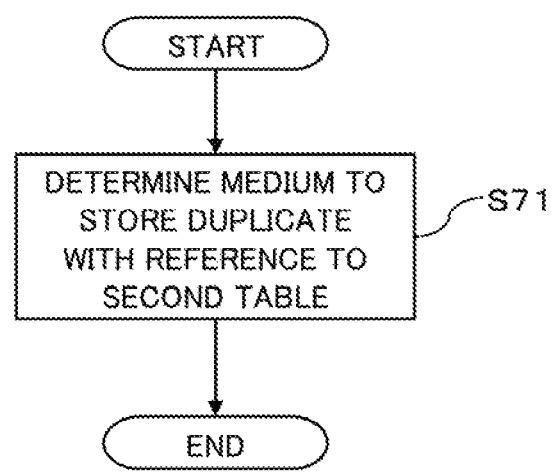
FIG. 24 is a flow diagram denoting a succession of procedural steps performed by a data storage device control program of the second embodiment.
Figure 25:
FIG. 25 is a diagram illustrating an example of a first table of the second embodiment.

Here, the method of arranging data of the second embodiment will now be further detailed with reference to FIGS. 24-28. FIG. 24 is a flow diagram denoting a succession of procedural steps performed by the data arranging program (data storage device control program) P2 of the second embodiment. FIGS. 25-28 are diagrams respectively denoting the first to the fourth tables T1-T4 of the second embodiment.

Like the first embodiment, the second embodiment determines a data block to be duplicated on the basis of a data migration list T1 (see FIG. 25) input from the server 2. The data blocks to be duplicated in the second embodiment are all the data blocks. Here, the data blocks are assumed to be arranged in the media #0 and #1 considering the axis AB of obtaining data (see the left side of FIG. 8; first arrangement). Under this state, the second table T2 as illustrated in FIG. 26 are generated such that the duplicates of the data blocks are to be stored in the media #2 and #3 considering the axis XY of obtaining data (see the right side of FIG. 8; second arrangement).

Figure 26:
FIG. 26 is a diagram illustrating an example of a second table of the second embodiment.

The second table T2 denoted in FIG. 26 associates a medium ID and data to be stored in the medium specified by the medium ID with each other. Furthermore, in the second table T2 of FIG. 26, since data classified into A, B, X, and Y are allocated to the media #0, #1, #2 and #3, respectively, the data blocks AX and AY are stored in the medium #0; the data blocks BX and BY are stored in the medium #1; the data blocks AX and BX are stored in the medium #2; and the data blocks AY and BY are stored in the medium #3.

Figure 27:
FIG. 27 is a diagram illustrating an example of a third table of the second embodiment.
Figure 28:
FIG. 28 is a diagram illustrating an example of a fourth table of the second embodiment.

The duplicator 514 determines a medium 62 (storing media) to store a duplicate of each data block by referring, in relation to the classification of the data block, to the second table T2 of FIG. 26 (step S71). The process of step S71 is carried out on all the classifications of data blocks. As a result, a third table T3 (see FIG. 27) is generated in which a data ID identifying data (data block) to be stored is associated with the data and a medium ID identifying the medium to store the data. Like the first embodiment, data in the form of the third table T3 denoted in FIG. 27 is stored in the temporary buffer 521 until the data is written from the temporary buffer 521 into the media 62.

Data is stored from the temporary buffer 521 to the media on the basis of the third table T3 of FIG. 27 in the following manner. Specifically, the data having a data ID 0 (data block AX; see FIG. 25) is stored in the media #0 and #2; the data having a data ID 1 (data block BX; see FIG. 25) is stored in the media #1 and #2; the data having a data ID 2 (data block AY; see FIG. 25) is stored in the media #0 and #3; and the data having an data ID 3 (data block BY; see FIG. 25) in the media #1 and #3.

Also in the second embodiment, after data is written into the media 62, the data ID of the data (data block) stored in each medium 62 is managed to achieve data obtaining (access to read data) in response to an instruction of the server 2. For example, the fourth table T4 denoted in FIG. 28, in which a medium ID of each medium and the data ID of the data stored in a medium identified by the medium ID are associated with each other, is stored in the memory 52.

As described above, the method of arranging data of the second embodiment is carried out like the first embodiment. However, the method of arranging data duplicates all the data and recovers the contents of the media using the data managed by the fourth table T4 when a medium failure occurs. As described above, the second embodiment duplicates all the data blocks for enhancing the reliability differently from the first embodiment, which duplicates a data block having a small ratio.

When a medium failure occurs, the data stored in the failed medium is obtained from another medium and is reconstructed in another medium. The server 5 confirms the data stored in the failed medium and confirms that each duplicate of the data stored in the failed medium is stored in which medium by referring to the management data of the fourth table T4. Also in the second embodiment, it is preferable that the entire data for the reconstruction is temporarily accumulated in the temporary buffer 521 and is written into the new medium in a lump all at once to reduce the number of times of changing a medium.

The number of applicable axes of obtaining data is the same as the number of duplicates. Increasing the number of duplicates more reduces the capacity efficiency but can lower the possibility of data loss. Accordingly, the number of duplicates are determined, depending on the availability (reliability) demanded for data. If three duplicates of data are generated for higher availability, the method of arranging data can deal with three axes of obtaining data. If four duplicates of data are generated, the method of arranging data can deal with four axes of obtaining data.

As described above, the method of arranging data of the second embodiment uses a duplicate originally generated for enhancing the reliability and can reduce the number of times of changing a medium, avoiding reduction in capacity efficiency, by contriving the arrangement of data in respective media, so that the time needed to obtain data can be reduced.

In particular, the second embodiment uses duplicates generated for enhancing the reliability and therefore does not lower the capacity efficiency. Specifically, the second embodiment can shorten the time to obtain data without an accompanying decline in the capacity efficiency by changing the arrangement of duplicates generated for enhancing the reliability. In addition, use of duplicates can avoid data loss when a single media failure occurs, and the second embodiment can also achieve the original object of the duplicates to enhance the reliability.

(6) Third Embodiment

Description will now be made in relation to the function of the storing processor 511 achieved by the processor 51 of the third embodiment executing the data arranging program P2. The third embodiment does not have to carry out the processes by the calculator 512, the determiner 513, and the duplicator 514, which are performed in the first embodiment.

The storing processor 511 of the third embodiment operates in the following manner when storing series data (e.g., log data) sequential along one (e.g., time) of multiple pieces of dimension information into multiple media 62. Specifically, the storing processor 511 of the third embodiment divides the series data at a predetermined boundary into an antecedent data block and stores the antecedent data block into medium #4 (see FIG. 9; antecedent medium). In addition to the above, the storing processor 511 of the third embodiment stores a subsequent data block containing partial data of an antecedent data block in a predetermined region before or antecedent to the predetermined boundary and the series data subsequent to the partial data into a medium #5 (see FIG. 9; subsequent medium).

An example of a "predetermined boundary" at which series data is divided is a point where each piece of series data contains the amount of 24-hour data. An example of "predetermined region" antecedent to the predetermined boundary is 2 hours (8.3%).

Figure 29:
FIG. 29 is a diagram illustrating an example of a fifth table of the third embodiment.

The third embodiment manages a residual capacity of each medium with a fifth table (medium residual capacity list) T5 so that the storing processor 511 can achieve the above function. FIG. 29 illustrates an example of the fifth table T5 of the third embodiment. The fifth table T5 is stored in the memory 52 of the server 5. As illustrated in FIG. 29, the medium ID specifying each medium 62 is associated with the residual capacity of the medium 62. In the example of FIG. 29, the residual capacity of the medium #0 having a medium ID 0 is 0%; and likewise, the residual capacities of the media #1, #2, and #3 are 15%, 95%, and 100%, respectively. The fifth table T5 (medium residual capacity list) is generated, updated, and managed by the processor 51 of the server 5.

Here, description will now be made in relation to an operation of the data arranging program P2 of the third embodiment, that is, an operation of writing data from the temporary buffer 521 to respective media 62 (the function of the storing processor 511 of the third embodiment) with reference to the flow diagram FIG. 30 (step S81-S87).

The storing processor 511 reads the residual capacity of the antecedent medium #4, into which data is to be written from the temporary buffer 521, from the fifth table T5, and compares the read residual capacity and data amount accumulated in the temporary buffer 521 (step S81). If the residual capacity is sufficient (YES route in step S81), the storing processor 511 writes the entire data having been stored in the temporary buffer 521 into the medium #4 (step S82).

Then the storing processor 511 confirms whether partial data (the duplicates of which are to be written into the next medium) exceeding the threshold exists in the antecedent data block (step S83). Here, the "partial data exceeding threshold" corresponds to partial data of the antecedent block in the predetermined range (e.g., the time 22:00 to the time 24:00) antecedent to the predetermined boundary.

If partial data exceeding the threshold exists (YES route in step S83), the storing processor 511 generates a duplicate of the partial data and writes the generated duplicate into the subsequent medium (next medium) #5 (step S84). This redundantly stores partial data containing two-hour data near the predetermined boundary in both media #4 and #5. The storing processor 511 then deletes the data in the temporary buffer 521 (step S85) and ends the process.

If the data amount in the temporary buffer 521 does not exceed the threshold (NO route in step S83), the storing processor 511 need not generate the duplicate. Consequently, the storing processor 511 does not write data into the subsequent medium #5, deletes the data in the temporary buffer 521 (step S85), and ends the process.

If the media residual capacity is less than the data amount in the temporary buffer 521 (NO route in step S81), the storing processor 511 writes the data in the temporary buffer 521 until the data amount in the antecedent medium #4 reaches the limit (100%) (step S86). Then the storing processor 511 writes the partial data near the predetermined boundary and then the remaining data, i.e., the entire subsequent data to the partial data (step S87), into the medium #5, deletes the data in the temporary buffer 521 (step S85), and ends the process. Here, writing data into each medium to the limit means that a division point (predetermined boundary) at which the series data is divided because the capacity of the medium being subjected to writing is entirely occupied always exists and partial data near the predetermined boundary always exists. For the above, the storing processor 511 does not determine whether partial data exceeding the threshold exists.

The method of arranging data of the third embodiment previously sets a threshold of a data amount to be duplicated. The threshold of a data amount to be duplicated corresponds to a predetermined region antecedent to the predetermined boundary (the division point). The partial data within the predetermined region is retained in the temporary buffer 521 without being deleted after having been written into the antecedent medium #4 and is to be also written into the top portion of the subsequent medium #5 when next data writing is carried out on the subsequent medium #5. This stores the partial data of a predetermined region antecedent to the predetermined boundary (division point) redundantly in the antecedent medium #4 and the subsequent medium #5 (see FIG. 9).

The threshold (the predetermined threshold) of the data amount to be duplicated is determined on the basis of a data amount that is collectively obtained for a single time. Assuming that the data amount collectively obtained for a single time is two-hour data, the threshold of a data amount to be duplicated is determined to be, for example, two-hour data.

As described in the first embodiment, with respect to the response time reducing rate (relative reducing time), it should be understood that increasing an amount of data to be duplicated (amount of data of redundant part) only brings large decline in capacity efficiency and does not largely contribute to the relative reducing time. The method of arranging data of the third embodiment may be solely used in a technique that stores data from the temporary buffer 521 to a medium 62 and may alternatively be used in combination with the above first or second embodiment.

As described above and illustrated in FIG. 9, the method of arranging data of the third embodiment stores, in storing time-series data such as log data into multiple media 62, the data stored in the end portion of the antecedent medium redundantly in the front (top) of the subsequent medium. This can abate unfairness due to the time of generating data and the time of obtaining data, and consequently, the well-balanced capacity efficiency and reduction in time taken to obtain data can be achieved.

(7) Others

The preferred embodiments of the present invention are described as above. However, the present invention is not limited to these particular embodiments and various changes and modifications can be suggested without departing from the gist of the present invention.

For example, the dimension information and the boundary information (e.g., the predetermined boundary, the threshold, and the predetermined range) may be input from the user via the input device 53.

The methods according to the embodiments of this disclosure can reduce the number of times of changing a medium without suppressing decline in capacity efficiency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A data storage apparatus comprising:
    a plurality of media that store data stored in a first storage device;
    a memory; and
    a processor coupled to the memory, wherein the processor is configured to:
    calculate a ratio of a size of each of a plurality of data blocks, which are classified into data of a plurality of pieces of dimension information for data stored in two or more of the plurality of media, to the amount of the data stored in the two or more of the plurality of media, the plurality of pieces of dimension information including two or more of time, position and log data;
    determine, based on a calculated ratio, a data block to be duplicated among the plurality of data blocks;
    allocate data of the data block to be duplicated to another medium of the plurality of media except for the two or more media;
    register a data block by indicating an association of the data of the data block to be duplicated with a medium to store the data of the data block to be duplicated in management information in the memory; and
    migrate data of the data block registered into the management information to an allocated medium, the data of the data block registered into the management information being stored in the first storage device.

2. The data storage apparatus according to claim 1, wherein the processor determines that a data block having a calculated ratio equal to or less than a threshold is to be duplicated, and determines that a data block having a calculated ratio more than the threshold is not to be duplicated.

3. The data storage apparatus according to claim 2, wherein
    the two or more media comprise a first medium and a second medium that store the data stored in the first storage device;
    the first medium stores a first data block classified into first class data of first dimension information of the plurality of pieces of dimension information and classified into first class data of second dimension information of the plurality of pieces of dimension information, and a second data block classified into the first class data of the first dimension information and classified into second class data of the second dimension information;
    the second medium stores a third data block classified into second class data of the first dimension information and classified into the first class data of the second dimension information, and a fourth data block classified into the second class data of the first dimension information and classified into the second class data of the second dimension information; and
    when the ratios of sizes of the first data block and the third data block to the amount of data stored in the two or more of the plurality of media, the ratios being calculated by the processor, are equal to or lower than the threshold, the processor determines that the first data block and the third data block are to be duplicated, generates duplicates of the first data block and the third data block, and stores the duplicates of the first data block and the third data block into the other medium.

4. The data storage apparatus according to claim 1, wherein
    the processor stores the data stored in the first storage device into one of the plurality of media; and
    when serial data that is successive in one of the plurality of pieces of dimension information is to be stored as the data into the plurality of media,
    the processor divides the serial data into an antecedent data block at a predetermined boundary and stores the antecedent data block in an antecedent medium included into the plurality of media, and stores a subsequent data block, containing partial data in a predetermined region antecedent to the predetermined boundary in the antecedent data block and data subsequent to the partial data, into a subsequent medium included in the plurality of media.

5. A non-transitory computer-readable recording medium having stored therein a data storage apparatus control program that causes a computer to execute a process comprising:
    calculating a ratio of a size of each of a plurality of data blocks, which are classified into data of a plurality of pieces of dimension information for data stored in two or more of a plurality of media, to the amount of the data stored in the two or more of the plurality of media, wherein the plurality of media are included in a second storage device and store data stored in a first storage device, the plurality of pieces of dimension information including two or more of time, position and log data;
    determining, based on a calculated ratio, a data block to be duplicated among the plurality of data blocks;
    allocating data of the data block to be duplicated to another medium of the plurality of media except for the two or more media;
    registering a data block by indicating an association of the data of the data block to be duplicated with a medium to store the data of the data block to be duplicated in management information in a memory; and
    migrating data of the data block registered into the management information to an allocated medium, the data of the data block registered into the management information being stored in the first storage device.

6. The non-transitory computer-readable recording medium according to claim 5, wherein the process executed by the computer further comprises: determining that a data block having the calculated ratio equal to or less than a threshold is to be duplicated, and determining that a data block having a calculated ratio more than the threshold is not to be duplicated.

7. The non-transitory computer-readable recording medium according to claim 6, wherein:
the two or more media comprise a first medium and a second medium that store the data stored in the first storage device; and
the process executed by the computer further comprises:
storing, into the first medium, a first data block classified into first class data of first dimension information of the plurality of pieces of dimension information and classified into first class data of second dimension information of the plurality of pieces of dimension information, and a second data block classified into the first class data of the first dimension information and classified into second class data of the second dimension information;
storing, into the second medium, a third data block classified into second class data of the first dimension information and classified into the first class data of the second dimension information, and a fourth data block classified into the second class data of the first dimension information and classified into the second class data of the second dimension information; and
when the ratios of sizes of the first data block and the third data block to the amount of data stored in the two or more of the plurality of media are equal to or lower than the threshold, determining that the first data block and the third data block are to be duplicated, generating duplicates of the first data block and the third data block, and storing the duplicates of the first data block and the third data block into the other medium.

8. The non-transitory computer-readable recording medium according to claim 5, wherein the process executed by the computer further comprises:
storing the data stored in the first storage device into one of the plurality of media,
when serial data that is successive in one of the plurality of pieces of dimension information is to be stored as the data into the plurality of media,
dividing the serial data into an antecedent data block at a predetermined boundary and storing the antecedent data block into an antecedent medium included in the plurality of media, and
storing a subsequent data block, containing partial data in a predetermined region antecedent to the predetermined boundary in the antecedent data block and data subsequent to the partial data, into a subsequent medium included in the plurality of media.

9. A method of controlling a data storage apparatus comprising a plurality of media that store data stored in a first storage device, a memory, and a processor coupled to the memory, the method comprising:
calculating a ratio of a size of each of a plurality of data blocks, which are classified into data of a plurality of pieces of dimension information for data stored in two or more of the plurality of media, to the amount of the data stored in the two or more of the plurality of media of the data storage apparatus, wherein the plurality of media are included in a second storage device and store data stored in the first storage device, the plurality of pieces of dimension information including two or more of time, position and log data;

determining, based on a calculated ratio, a data block to be duplicated among the plurality of data blocks;
allocating data of the data block to be duplicated to another medium of the plurality of media except for the two or more media;
registering a data block by indicating an association of the data of the data block to be duplicated with a medium to store the data of the data block to be duplicated in management information in the memory; and
migrating data of the data block registered into the management information to an allocated medium, the data of the data block registered into the management information being stored in the first storage device.

10. The method according to claim 9, further comprising: determining that a data block having the calculated ratio equal to or less than a threshold is to be duplicated and determining that a data block having a calculated ratio more than the threshold is not to be duplicated.

11. The method according to claim 10, wherein:
the two or more media comprises a first medium and a second medium that store the data stored in the first storage device; and
the method further comprises:
storing, into the first medium, a first data block classified into first class data of first dimension information of the plurality of pieces of dimension information and classified into first class data of second dimension information of the plurality of pieces of dimension information, and a second data block classified into the first class data of the first dimension information and classified into second class data of the second dimension information;
storing, into the second medium, a third data block classified into second class data of the first dimension information and classified into the first class data of the second dimension information, and a fourth data block classified into the second class data of the first dimension information and classified into the second class data of the second dimension information; and
when the ratios of sizes of the first data block and the third data block to the amount of data stored in the two or more of the plurality of media are equal to or lower than the threshold, determining that the first data block and the third data block are to be duplicated, generating duplicates of the first data block and the third data block, and storing the duplicates of the first data block and the third data block into the other medium.

12. The method according to claim 9, further comprising:
storing the data stored in the first storage device into one of the plurality of media,
when serial data that is successive in one of the plurality of pieces of dimension information is to be stored as the data into one of the plurality of media,
dividing the serial data into an antecedent data block at a predetermined boundary and storing the antecedent data block into an antecedent medium included in the plurality of media, and
storing a subsequent data block, containing partial data in a predetermined region antecedent to the predetermined boundary in the antecedent data block and data subsequent to the partial data, into a subsequent medium included in the plurality of media.

* * * * *